(12) United States Patent
Hatoyama et al.

(10) Patent No.: US 8,610,844 B2
(45) Date of Patent: Dec. 17, 2013

(54) LIQUID CRYSTAL DISPLAY

(75) Inventors: Fumiaki Hatoyama, Tokyo (JP); Yoshinori Higuchi, Tokyo (JP)

(73) Assignee: Tescom Co., Ltd., Tokyo (JP)

( * ) Notice: Subject to any disclaimer, the term of this patent is extended or adjusted under 35 U.S.C. 154(b) by 17 days.

(21) Appl. No.: 12/998,811

(22) PCT Filed: Dec. 4, 2008

(86) PCT No.: PCT/JP2008/072007
§ 371 (c)(1),
(2), (4) Date: Sep. 15, 2011

(87) PCT Pub. No.: WO2010/064311
PCT Pub. Date: Jun. 10, 2010

(65) Prior Publication Data
US 2012/0002140 A1    Jan. 5, 2012

(51) Int. Cl.
*G02F 1/1347* (2006.01)
(52) U.S. Cl.
USPC .................................. 349/74; 349/76; 349/77
(58) Field of Classification Search
USPC ...................................................... 349/74–81
See application file for complete search history.

(56) References Cited

U.S. PATENT DOCUMENTS 5,726,723 A * 3/1998 Wang et al. ..................... 349/75

FOREIGN PATENT DOCUMENTS

| JP | 53064533 | 6/1978 |
|---|---|---|
| JP | 57125919 | 8/1982 |
| JP | 61286815 | 12/1986 |
| JP | 063055528 | 3/1988 |
| JP | 06082786 | 3/1994 |
| JP | 09133907 | 5/1997 |
| JP | 10268251 | 10/1998 |
| JP | 2001142091 | 5/2001 |
| JP | 2005189480 | 7/2005 |
| JP | 2006235581 | 9/2006 |

OTHER PUBLICATIONS

English Abstract of JP2006235581.
English Abstract of JP61286815.
English Abstract of JP2005189480.
English Abstract of JP2001142091.
English Abstract of JP63055528, Mar. 1998.
English Abstract of JP06082786, Mar. 1994.
English Abstract of JP09133907, May 1997.
English Abstract of JP10268251, Oct. 1998.
English Abstract of JP53064533, Jun. 1978.
English Abstract of JP57125919, Aug. 1992.

* cited by examiner

*Primary Examiner* — James Dudek
(74) *Attorney, Agent, or Firm* — Dykema Gossett PLLC

(57) ABSTRACT

In a liquid crystal display (1), a transparent electrode (100) constituting a display liquid crystal cell (30) has a plurality of patterns (102, and the like) for forming a desired pattern in the outer circumferential part (101) forming the whole display region, and transparent electrodes (13*a*, 13*b*) are sandwiching at least a part of liquid crystal molecules of a liquid crystal layer (20). When voltage application control of the plurality of patterns (102, and the like) is performed, respectively, for the whole display region displayed by bright display or dark display, a desired pattern can be displayed by reversed bright/dark display of the bright/dark display of the whole display region. Furthermore, the bright/dark display of at least a part of the whole display and the desired pattern can be reversed by applying a voltage to the transparent electrodes (13*a*, 13*b*) and changing the orientation of whole liquid crystal molecules of the liquid crystal layer (20) to the direction parallel with the normal to a substrate (11).

5 Claims, 11 Drawing Sheets

LIQUID CRYSTAL DISPLAY

TECHNICAL FIELD

The present invention relates to liquid crystal displays and, more particularly, to a liquid crystal display with two liquid crystal cells in layers.

BACKGROUND ART

There have been conventionally known liquid crystal displays configured to carry out a desired display by sandwiching the upper and lower sides with polarizers, and by transmitting or not transmitting light in a vertical direction through a liquid crystal cell disposed such that the liquid crystal layer has a predetermined twisted angle (see Patent Document 1, for example). As an example of the above liquid crystal displays, there is known such a liquid crystal display 200 having a liquid crystal layer 240 as shown in FIGS. 10 and 11. For the sake of convenience, explanations will be given with the directions of arrow shown in FIGS. 10 and 11 as frontward, backward, leftward, rightward, upward and downward directions. The directors of the liquid crystal molecules constituting the liquid crystal layer 240 are the direction of an arrow 241 in the lower end portion, and the direction of an arrow 246 which turns the arrow 241 by 90 degrees clockwise in the frontward, backward, leftward, and rightward direction in the upper end portion as shown in FIG. 11, while the directors are gradually twisted to form a TN (Twisted Nematic) type in the intermediate portion.

Further, the liquid crystal layer 240 is sandwiched by alignment layers 232 on the upper and lower sides. Transparent electrodes 233 and 235 are provided on the upper and lower outsides of the alignment layers 232, and the transparent electrodes 235 are electrically connected to an AC power supply 236. The transparent electrodes 233 and 235 are sandwiched by substrates 231 on the upper and lower sides, and the substrates 231 and a seal material 234 seals the liquid crystal molecules of the liquid crystal layer 240. A liquid crystal cell 230 is thus constituted by these substrates 231, seal material 234, transparent electrodes 233 and 235, alignment layers 232, and liquid crystal layer 240. The liquid crystal cell 230 is sandwiched by polarizers 203 and 204 on the upper and lower sides, and arranged such that the transmission axis direction 203a of the polarizer 203 is parallel to the transmission axis direction 204a of the polarizer 204. A backlight 202 is disposed below the polarizer 203.

With respect to the liquid crystal display 200 of the above configuration, illumination light from the backlight 202 is irradiated to the liquid crystal cell 230, and an illumination light 202a changes the polarizing direction 90 degrees clockwise inside the liquid crystal cell 230 according to the twisted angle of the liquid crystal molecules inside the liquid crystal layer 240, and reaches the polarizer 204. At the time, as shown in FIG. 11, because the transmission axis direction 204a of the polarizer 204 is in a 90-degree turned position relation with the direction of the arrow 246, the illumination light 202a cannot be transmitted through the polarizer 204, and thereby that portion is darkly displayed.

On the other hand, if the AC power supply 236 applies a voltage to the transparent electrodes 235, the liquid crystal molecules inside the liquid crystal layer 240 will align with the major axis vertically directed. Therefore, an illumination light 202b travelling through the voltage-applied portion reaches the polarizer 204 without being twisted by the liquid crystal molecules inside the liquid crystal layer 240. That is, because the illumination light 202b reaches the polarizer 204 along the director of the arrow 241 without change, the illumination light 202b is transmitted through the polarizer 204, and thereby brightly displayed (negative mode). Thus, it is possible to brightly and darkly display a desired pattern (in black and white) by providing a plurality of transparent electrodes 235 for forming the desired patterns, and carrying out control of the voltage application from the AC power supply to each transparent electrode. Further, it is possible to configure a dark display of the desired pattern inside a bright background (i.e. positive mode) by turning the polarizer 204 by 90 degrees, for example, in the frontward, backward, leftward and rightward direction.

Patent Document 1: JP2006-235581 A

The above liquid crystal display 200 provides negative mode of brightly displaying a desired pattern inside a dark background. However, under bright usage environments surrounded by outside light such as natural sunlight and the like, the outside light is reflected on the background to cause the background to look bright, and thus the contrast becomes smaller between the desired pattern being brightly displayed and the background, thereby lowering the visibility of the desired pattern.

Further, because the liquid crystal molecules inside the liquid crystal layer 240 are uniaxial birefringent crystal having an optical axis in the major axis direction, if an oblique illumination light 202c is transmitted in the minor axis direction of the liquid crystal layer 240 or in an oblique direction, it would occur a retardation upon transmission through the liquid crystal cell 230 due to the influence of birefringence. Thereby, when the oblique illumination light 202c is obliquely transmitted through the above liquid crystal display 200, that is, when the liquid crystal display 200 is viewed at an angle, it gives rise to color shift due to the retardation in comparison with the illumination light 202b, that is, when the liquid crystal display 200 is viewed directly above.

SUMMARY OF THE INVENTION

In view of the above problems to be solved, an object of the present invention is to provide a liquid crystal display with a high visibility unaffected by the brightness of surrounding environments and, furthermore, with little color shift in the case of being viewed at an angle.

In order to solve the above problems, a first aspect in accordance with the present invention provides a liquid crystal display having: an upside liquid crystal cell composed of upside substrates disposed parallel to each other, a pair of plate-shaped transparent upside electrodes disposed parallel to the upside substrates between the upside substrates, and an upside liquid crystal layer sealed in a layered form between the pair of upside electrodes; and a downside liquid crystal cell composed of downside substrates disposed parallel to each other, a pair of plate-shaped transparent downside electrodes disposed parallel to the downside substrates between the downside substrates, and a downside liquid crystal layer sealed in a layered form between the pair of downside electrodes, and disposed on the lower surface of the upside liquid crystal cell to join therewith. Then, upside liquid crystal molecules constituting the upside liquid crystal layer are positioned to twist in a first twist direction along a helical axis parallel to the normal of the upside substrates, while downside liquid crystal molecules constituting the downside liquid crystal layer are positioned to twist in a second twist direction along a helical axis parallel to the normal of the downside substrates. Further, one electrode pair of the pair of upside electrodes and the pair of downside electrodes has a plurality of pattern electrodes forming a desired pattern (the pattern 102 in the preferred embodiment, for example) among the total electrodes forming an entire display area (the periphery portion 101 in the preferred embodiment, for example), and the other electrode pair of the pair of upside electrodes and the pair of downside electrodes sandwiches at least a portion of the upside liquid crystal molecules or at least a portion of the downside liquid crystal molecules. At the time, with respect to the entire display area displayed by bright display or dark display, each of the plurality of pattern electrodes is under voltage application control so as to display the desired pattern by bright and dark display opposite to the entire display area and, furthermore, a voltage is applied to the other electrode pair so as to change the director of at least a portion of the upside liquid crystal molecules or the director of at least a portion of the downside liquid crystal molecules to a direction parallel to the normal of the upside substrates or to a direction parallel to the normal of the downside substrates, thereby reversing the bright and dark displays of at least a portion of the entire display area and at least a portion of the desired pattern.

In the liquid crystal display of the above configuration, it is preferable that the first twist direction be opposite to the second twist direction; and the twisted angle of the upside liquid crystal molecules relative to the first twist direction and the twisted angle of the downside liquid crystal molecules relative to the second twist direction be equal to or above 90 degrees and below 180 degrees. Further, In the liquid crystal display of the above configuration, it is preferable that the director of the upside liquid crystal molecules positioned in the lower-end vicinity of the upside liquid crystal layer be 90-degree different from or 180-degree opposite to that of the downside liquid crystal molecules positioned in the upper-end vicinity of the downside liquid crystal layer.

Further, in the liquid crystal display of the above configuration, it is preferable that the pre-tilt angle of the upside liquid crystal molecules positioned in the upper-end vicinity of the upside liquid crystal layer be in opposite direction to and have almost the same degree as that of the downside liquid crystal molecules positioned in the lower-end vicinity of the downside liquid crystal layer; and the pre-tilt angle of the upside liquid crystal molecules positioned in the lower-end vicinity of the upside liquid crystal layer be in opposite direction to and have almost the same degree as that of the downside liquid crystal molecules positioned in the upper-end vicinity of the downside liquid crystal layer. Furthermore, in the liquid crystal display of the above configuration, it is preferable that the pair of upside electrodes and the pair of downside electrodes be configured by utilizing transparent electrodes such as those of ITO and the like.

On the other hand, a second aspect in accordance with the present invention provides a liquid crystal display having: an upside liquid crystal cell composed of a pair of transparent upside substrates disposed parallel to each other, and an upside liquid crystal layer sealed in a layered form between the pair of upside substrates; a downside liquid crystal cell composed of a pair of transparent downside substrates disposed parallel to each other, and a downside liquid crystal layer sealed in a layered form between the pair of downside substrates, and disposed on the lower surface of the upside liquid crystal cell to join therewith; an upside polarizer allowing linearly polarized light of a predetermined transmission axis direction to be transmitted therethrough, and disposed on the upper surface of the upside liquid crystal cell to join therewith; and a downside polarizer allowing linearly polarized light of a predetermined transmission axis direction to be transmitted therethrough, and disposed on the lower surface of the downside liquid crystal cell to join therewith. At the time, upside liquid crystal molecules constituting the upside liquid crystal layer are positioned to twist in a first twist direction along a helical axis parallel to the normal of the upside substrates, while downside liquid crystal molecules constituting the downside liquid crystal layer are positioned to twist in a second twist direction along a helical axis parallel to the normal of the downside substrates, and the first twist direction is opposite to the second twist direction. Further, the pre-tilt angle of the upside liquid crystal molecules positioned in the upper-end vicinity of the upside liquid crystal layer is in opposite direction to and has almost the same degree as that of the downside liquid crystal molecules positioned in the lower-end vicinity of the downside liquid crystal layer, while the pre-tilt angle of the upside liquid crystal molecules positioned in the lower-end vicinity of the upside liquid crystal layer is in opposite direction to and has almost the same degree as that of the downside liquid crystal molecules positioned in the upper-end vicinity of the downside liquid crystal layer. Furthermore, the director of the upside liquid crystal molecules positioned in the lower-end vicinity of the upside liquid crystal layer is 180-degree opposite to that of the downside liquid crystal molecules positioned in the upper-end vicinity of the downside liquid crystal layer.

Further, in the liquid crystal display of the above configuration, it is preferable that the twisted angle of the upside liquid crystal molecules relative to the first twist direction and the twisted angle of the downside liquid crystal molecules relative to the second twist direction be equal to or above 90 degrees and below 180 degrees. Further, it is preferable that the upside liquid crystal molecules and the downside liquid crystal molecules be derived from twisted nematic liquid crystal having an identical birefringent property.

Further, in the liquid crystal display of the above configuration, it is preferable that at least one be almost parallel to the other between the predetermined transmission axis direction of the upside polarizer and the director of the upside liquid crystal molecules positioned in the upper-end vicinity of the upside liquid crystal layer, and between the predetermined transmission axis direction of the downside polarizer and the director of the downside liquid crystal molecules positioned in the lower-end vicinity of the downside liquid crystal layer.

By virtue of the liquid crystal display in accordance with the first aspect of the present invention, an easy and simple method of applying a voltage to the other electrode pair is utilized to instantly change the director of the upside liquid crystal molecules or the director of the downside liquid crystal molecules sandwiched by the other electrode pair to a direction parallel to the normal of the upside substrates or to a direction parallel to the normal of the downside substrates. Thereby, it becomes possible to appropriately reverse the bright and dark displays of at least a portion of the entire display area and at least a portion of the desired pattern according to the brightness of surrounding environments to select such a bright and dark display as presents a clear contrast between the entire display area and the desired pattern. Thereby, it is possible to provide a liquid crystal display with a constantly high visibility without being affected by the brightness of surrounding environments.

In this display, because the first twist direction is opposite to the second twist direction, and the twisted angle of the upside liquid crystal molecules relative to the first twist direction and the twisted angle of the downside liquid crystal molecules relative to the second twist direction are equal to or above 90 degrees and below 180 degrees, the illumination light entering each of the liquid crystal layers will not exit the liquid crystal layer with the same polarizing direction as that of entering and thus without being twisted. Thereby, it is possible for the liquid crystal display to carry out a display with clearer and/or higher contrast.

Further, because the director of the upside liquid crystal molecules positioned in the lower-end vicinity of the upside liquid crystal layer is 90-degree different from or 180-degree opposite to that of the downside liquid crystal molecules positioned in the upper-end vicinity of the downside liquid crystal layer, in the portion of the lower-end vicinity of the upside liquid crystal layer and the upper-end vicinity of the downside liquid crystal layer, even if the illumination light happens to obliquely traverse the liquid crystal molecules, it is still possible to compensate the influence of birefringence from the liquid crystal molecules. Then, the outgoing illumination light from the liquid crystal display is able to exit in the state of a linearly polarized light as it is without being changed into an ellipsoidal polarized light. Therefore, it is possible to present a clear contrast between the entire display area and the desired pattern, thereby allowing for a liquid crystal display with a high visibility.

Further, because the pair of the liquid crystal molecules in the upper-end vicinity of the upside liquid crystal layer and in the lower-end vicinity of the downside liquid crystal layer, and the pair of the liquid crystal molecules in the lower-end vicinity of the upside liquid crystal layer and in the upper-end vicinity of the downside liquid crystal layer are opposite in direction and have almost the same degree in pre-tilt angle, it is possible to cancel out the retardation occurring in one liquid crystal layer of the upside liquid crystal layer and the downside liquid crystal layer by the completely opposite retardation occurred in the other liquid crystal layer for the illumination light travelling obliquely, i.e. when the liquid crystal display is viewed at an angle. Thereby, the obliquely outgoing illumination light from the liquid crystal display does not have retardation, and thus it is possible to display without color shift in comparison with the illumination light travelling straightforwardly.

Further, because the pair of upside electrodes and the pair of downside electrodes are configured by utilizing ITO electrodes, and thus can be transparently configured. By virtue of this, the illumination light will not be hindered from travelling through those electrodes. Therefore, inside the upside liquid crystal cell and the downside liquid crystal cell, the illumination light exits the liquid crystal display without being weakened. Hence, it is possible to present a clear contrast between the entire display area and the desired pattern, thereby allowing for a liquid crystal display with a high visibility.

By virtue of the liquid crystal display in accordance with the second aspect of the present invention, the first twist direction of the upside liquid crystal molecules is opposite to the second twist direction of the downside liquid crystal molecules. The pre-tilt angle of the upside liquid crystal molecules positioned in the upper-end vicinity of the upside liquid crystal layer and the pre-tilt angle of the downside liquid crystal molecules positioned in the lower-end vicinity of the downside liquid crystal layer, and the pre-tilt angle of the upside liquid crystal molecules positioned in the lower-end vicinity of the upside liquid crystal layer and the pre-tilt angle of the downside liquid crystal molecules positioned in the upper-end vicinity of the downside liquid crystal layer are in opposite direction and have almost the same angle of degree. Furthermore, the director of the upside liquid crystal molecules positioned in the lower-end vicinity of the upside liquid crystal layer is 180-degree opposite to that of the downside liquid crystal molecules positioned in the upper-end vicinity of the downside liquid crystal layer. That is, the upside liquid crystal layer and the downside liquid crystal layer form an approximately symmetrical structure in the vertically direction. By virtue of the this configuration, when the illumination light travels upward from below in an oblique direction through the liquid crystal display, for example, it is possible to mutually cancel out, i.e. compensate, the retardation; that is, the retardation bestowed in the downside liquid crystal layer is cancelled out by the retardation bestowed in the upside liquid crystal layer and completely opposite to that occurring in the downside liquid crystal layer. Thereby, the illumination light travelling in an oblique direction exits the liquid crystal display in a state without retardation, and thus it is possible to further deter the occurrence of color shift when the liquid crystal display is viewed at an angle.

In the liquid crystal display, because the twisted angle of the upside liquid crystal molecules relative to the first twist direction and the twisted angle of the downside liquid crystal molecules relative to the second twist direction are equal to or above 90 degrees and below 180 degrees, the illumination light entering each of the liquid crystal layers will not exit the liquid crystal layer with the same polarizing direction as that of entering and thus without being twisted. Thereby, it is possible for the liquid crystal display to carry out a clearer display.

Further, chiral material is added for maintaining the twist pitches of the both liquid crystal molecules at almost the same. Even though effect of temperature change occurs in both liquid crystal layers, the twist pitches of both liquid crystal molecules can be maintained at almost the same. Thereby, the aforementioned vertically symmetrical structure is maintained between the upside liquid crystal layer and the downside liquid crystal layer. Hence, the illumination light travelling in an oblique direction exits the liquid crystal display in a state without retardation, and thus it is possible to further deter the occurrence of color shift when viewing the liquid crystal display from the oblique direction.

Further, at least one is almost parallel to the other between the predetermined transmission axis direction of the upside polarizer and the director of the upside liquid crystal molecules positioned in the upper-end vicinity of the upside liquid crystal layer, and between the predetermined transmission axis direction of the downside polarizer and the director of the downside liquid crystal molecules positioned in the lower-end vicinity of the downside liquid crystal layer. When the illumination light enters from the upper side of the upside polarizer or from the lower side of the downside polarizer, only the linearly polarized light of the predetermined transmission axis direction travels inside the upside liquid crystal cell and the downside liquid crystal cell, and then it is able to exit the liquid crystal display to allow for a clear display without including any circularly-polarized light.

DESCRIPTION OF THE PREFERRED EMBODIMENT

Figure 1:
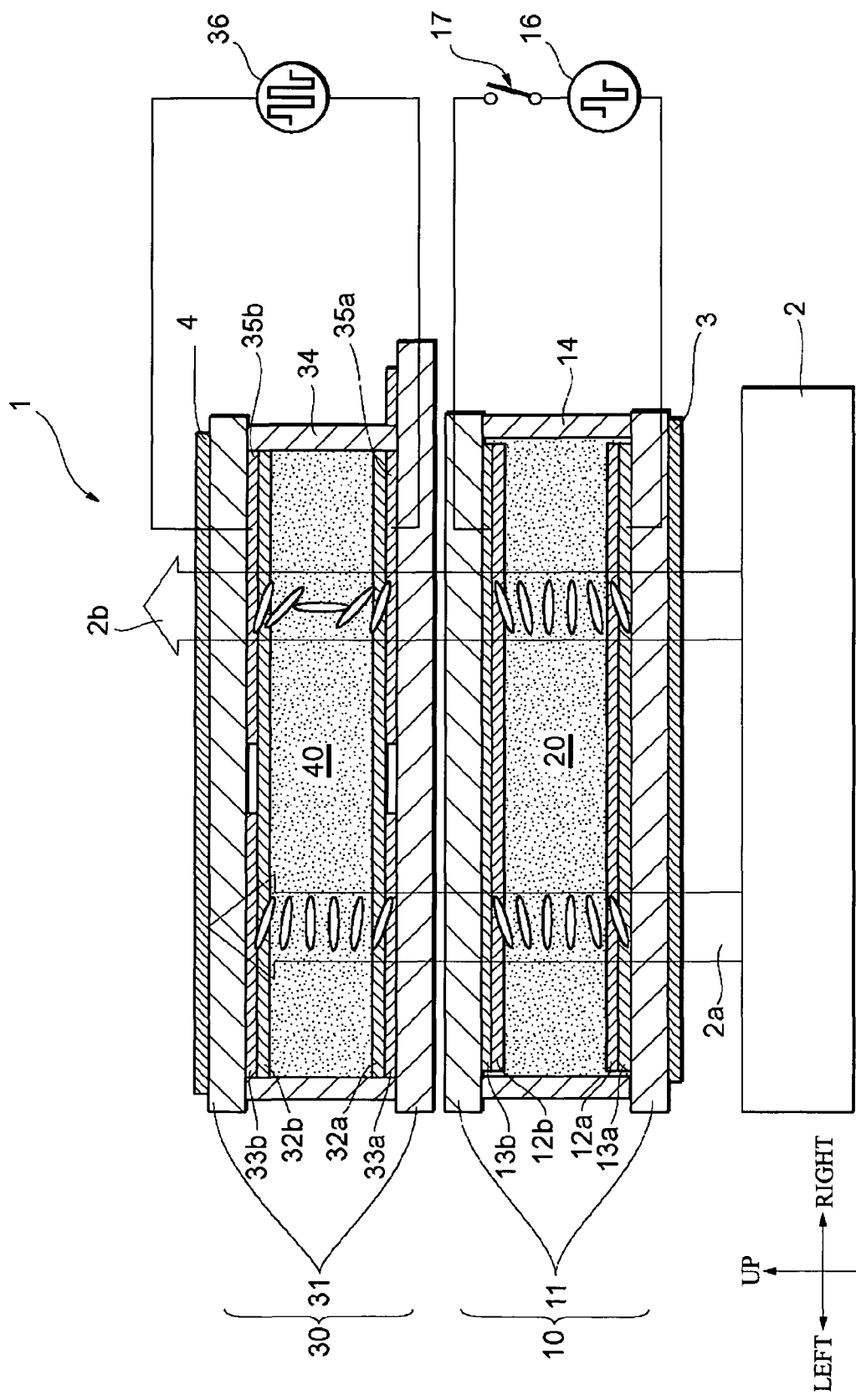
FIG. 1 is a sectional side view showing a liquid crystal display (negative mode) in accordance with the present invention.

Referring to FIGS. 1 to 7, descriptions will be made hereinbelow with respect to a preferred embodiment of a liquid crystal display 1 in accordance with the present invention. For the sake of convenience, descriptions will be made with the directions of arrow shown in each drawing as frontward, backward, leftward, rightward, upward and downward directions. As shown in FIG. 1, the liquid crystal display 1 is constituted mainly by a backlight 2, a lower polarizer 3, an upper polarizer 4, a reverse control liquid crystal cell 10, and a display liquid crystal cell 30.

The reverse control liquid crystal cell 10 is constituted into a flat plate by substrates 11, alignment layers 12a and 12b, transparent electrodes 13a and 13b, a seal material 14, an AC power supply 16, a selection switch 17, and a liquid crystal layer 20. The liquid crystal layer 20 is an optically uniaxial birefringent crystal which utilizes a twisted nematic liquid crystal material, and is formed by laminating liquid crystal molecules into layers having a regular director, and has a birefringent property in the minor axis direction and not in the major axis direction. To this twisted nematic liquid crystal material, a chiral material is added for controlling the twist pitch of the liquid crystal molecules. As a chiral material, for example, chiral nematic liquid crystals and cholesteric liquid crystals are utilized.

Each of the alignment layers 12a and 12b has undergone an aligning treatment (rubbing process) on one surface. The liquid crystal molecules of the liquid crystal layer 20 are aligned to line up the major axis in that direction, and are formed to have a pre-tilt angle approximately 2 to 10 degrees relative to the surfaces of the alignment layers 12a and 12b. The pre-tilt angle is determined according to the material of the alignment layers 12a and 12b and the liquid crystal molecules.

The transparent electrodes 13a and 13b are formed to be transparent flat plates by utilizing such as ITO electrodes with a small amount of tin oxide added to indium oxide, and a voltage can be applied thereto from outside. The AC power supply 16 is electrically connected with the transparent electrodes 13a and 13b, and can apply a voltage to the entire area of the transparent electrodes 13a and 13b. The selection switch 17 is provided in an electrical circuit electrically connecting the transparent electrodes 13a and 13b with the AC power supply 16. It is possible to switch arbitrarily to select whether or not to apply a voltage to the transparent electrodes 13a and 13b from the AC power supply 16 by turning on or off the selection switch 17.

The substrates 11 are planar substrates formed by utilizing such as transparent glass, and the illumination light irradiated from the backlight 2 can be transmitted therethrough. The seal material 14 is formed of a material through which the liquid crystal molecules of the liquid crystal layer 20 do not penetrate, and configured to prevent the liquid-state liquid crystal molecules from flowing to the outside and prevent contaminant from flowing into the liquid crystal layer 20 from the outside.

The display liquid crystal cell 30 is constituted into a flat plate by substrates 31, alignment layers 32a and 32b, lower transparent electrodes 33a and 35a, upper transparent electrodes 33b and 35b, a seal material 34, an AC power supply 36, and a liquid crystal layer 40. The liquid crystal layer 40 is, in the same manner as the aforementioned liquid crystal layer 20, formed by utilizing a twisted nematic liquid crystal material to which a chiral material is added. Here, the property and additive amount of the chiral material are adjusted such that the changes of twist pitch of the liquid crystal molecules may become equivalent between the liquid crystal layer 20 and the liquid crystal layer 40 when the temperature of the liquid crystal layers are changing (the temperature properties of liquid crystal). In the same manner as the aforementioned alignment layers 12a and 12b, the alignment layers 32a and 32b are formed after undergoing an aligning treatment.

Each of the transparent electrodes 33a, 33b, 35a and 35b is formed of a transparent conductive film. A plurality of lower transparent electrodes 35a and upper transparent electrodes 35b are provided to form a desired pattern and configured to display the pattern in black and white by carrying out control of the voltage application from the AC power supply 36 to each electrode. Similar to the substrates 11, the substrates 31 are planar substrates formed by utilizing such as transparent glass, and the illumination light irradiated from the backlight 2 can be transmitted therethrough. Similar to the seal material 14, the seal material 34 is formed of a material through which the liquid crystal molecules of the liquid crystal layer 40 do not penetrate. The AC power supply 36 is electrically connected with the transparent electrodes 35a and the transparent electrodes 35b, and can apply a voltage to each of the lower transparent electrodes 35a and upper transparent electrodes 35b.

Figure 3:
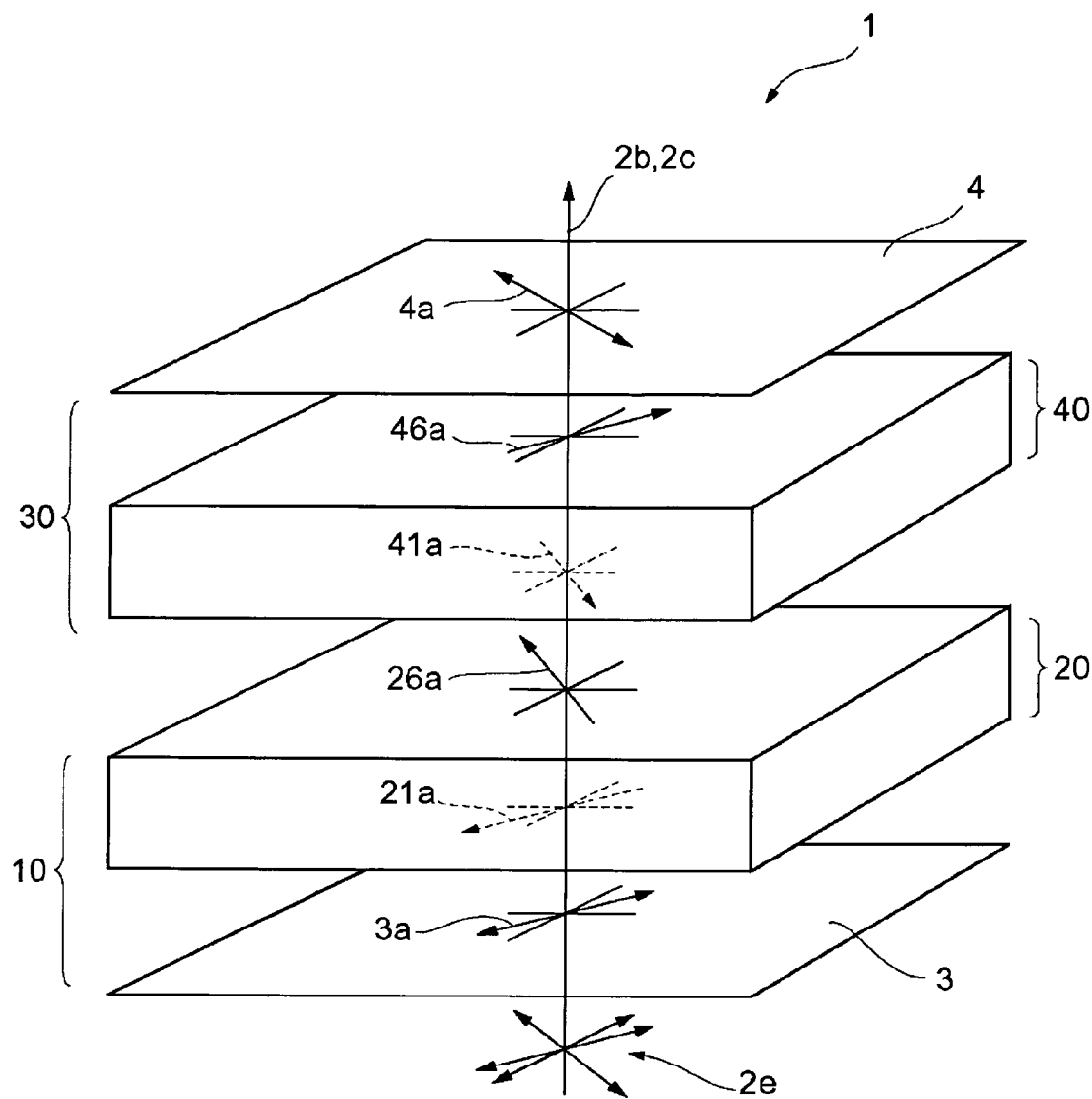
FIG. 3 is a pattern diagram showing directors of the liquid crystal display in accordance with the present invention.
Figure 3:
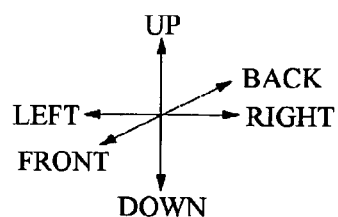

The lower polarizer 3 is a linear polarizer formed to allow only the linearly polarized light with vibration in the transmission axis direction 3a shown in FIG. 3 to be transmitted therethrough. Similar to the lower polarizer 3, the upper polarizer 4 is a linear polarizer formed to allow only the linearly polarized light with vibration in the transmission axis direction 4a shown in FIG. 3 to be transmitted therethrough. The backlight 2 is a light source irradiating illumination light from below the lower polarizer 3.

So far, the descriptions have been made hereinabove with respect to the component configuration of the liquid crystal display 1. Hereinbelow, descriptions will be made with respect to the assembly configuration of the liquid crystal display 1.

First, to describe the assembly configuration of the reverse control liquid crystal cell 10, the reverse control liquid crystal cell 10 forms an area of the liquid crystal layer 20 by disposing two substrates 11 on the upper and lower sides, and enclosing the space sandwiched by the two substrates 11 with the seal material 14 on the front, back, left and right sides. Further, the transparent electrode 13a is fixed on the upper surface of the lower substrate 11, and the alignment layer 12a is fixed on the upper surface of the transparent electrode 13a. On the other hand, the transparent electrode 13b is fixed on the lower surface of the upper substrate 11, and the alignment layer 12b is fixed on the lower surface of the transparent electrode 13b. Then, the transparent electrodes 13a and 13b are disposed to form a pair vertically facing each other. Further, as described hereinbefore, the transparent electrodes 13a and 13b are electrically connected with the AC power supply 16.

Figure 4A:
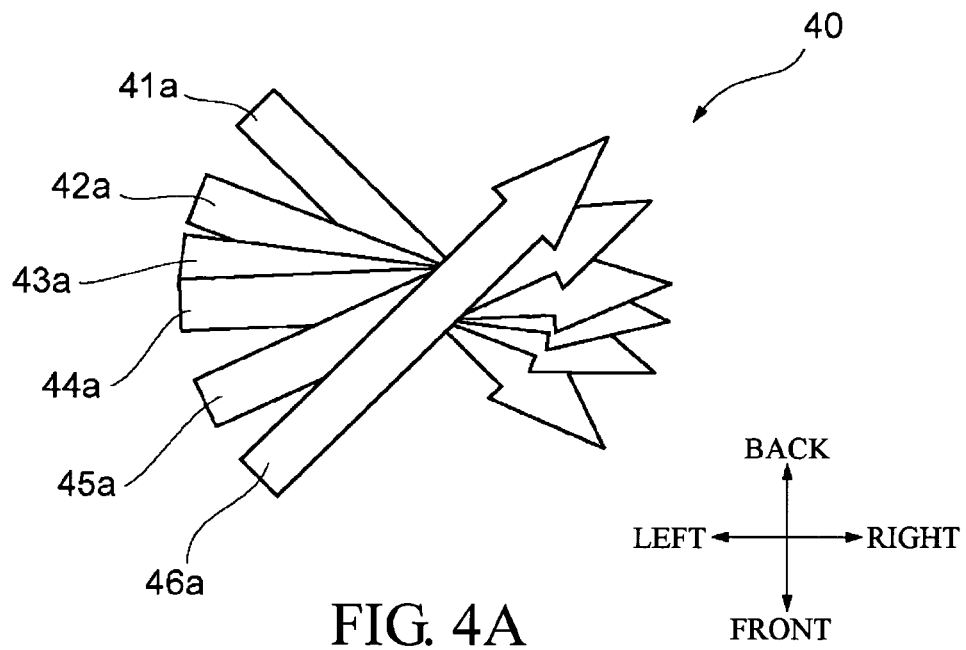
FIG. 4A is a pattern diagram showing directors of the liquid crystal inside a display liquid crystal cell.
Figure 4B:
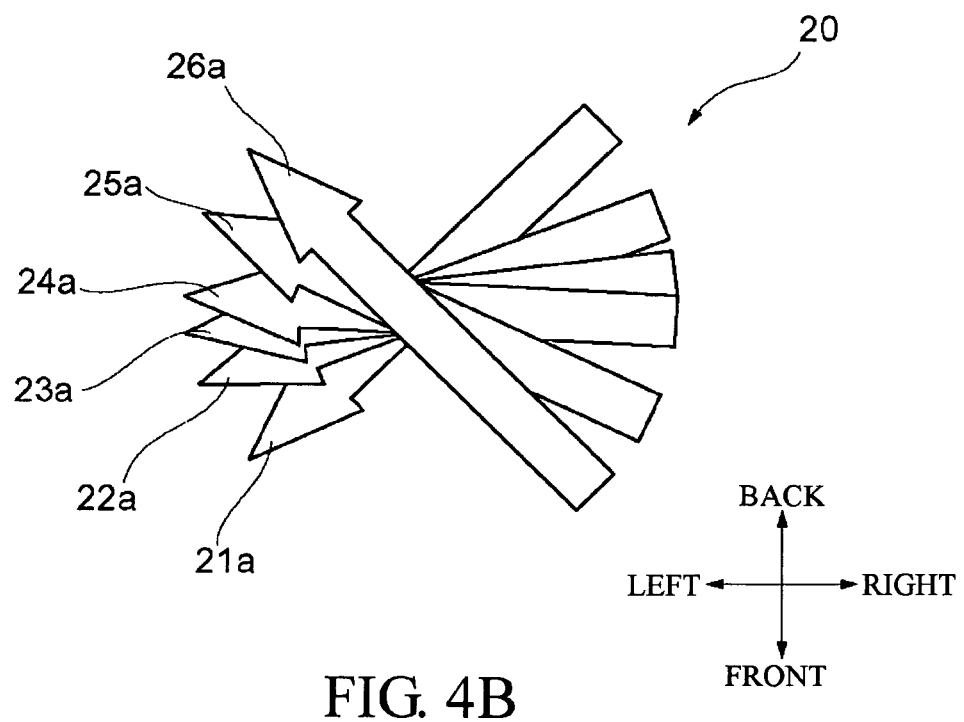
FIG. 4B is a pattern diagram showing directors of the liquid crystal inside a reverse control liquid crystal cell.
Figure 5A:
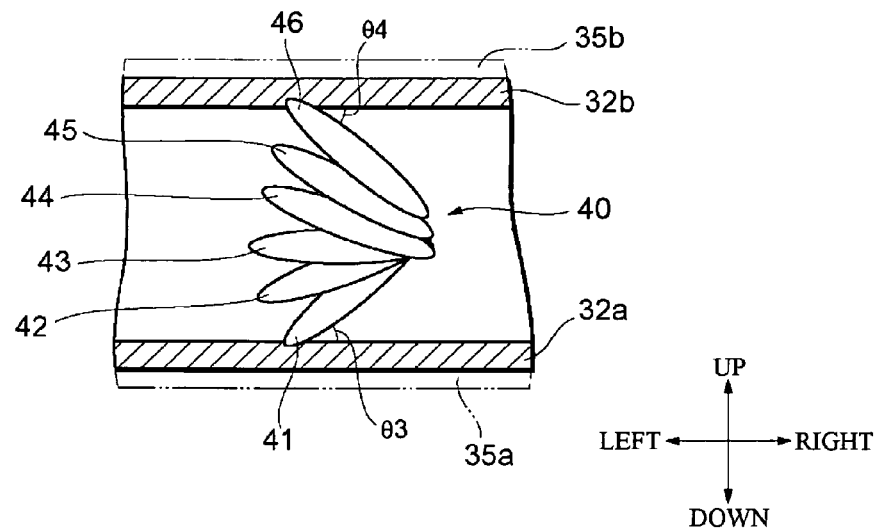
FIG. 5A is a pattern diagram showing tilt directions of the liquid crystal inside the display liquid crystal cell.
Figure 5B:
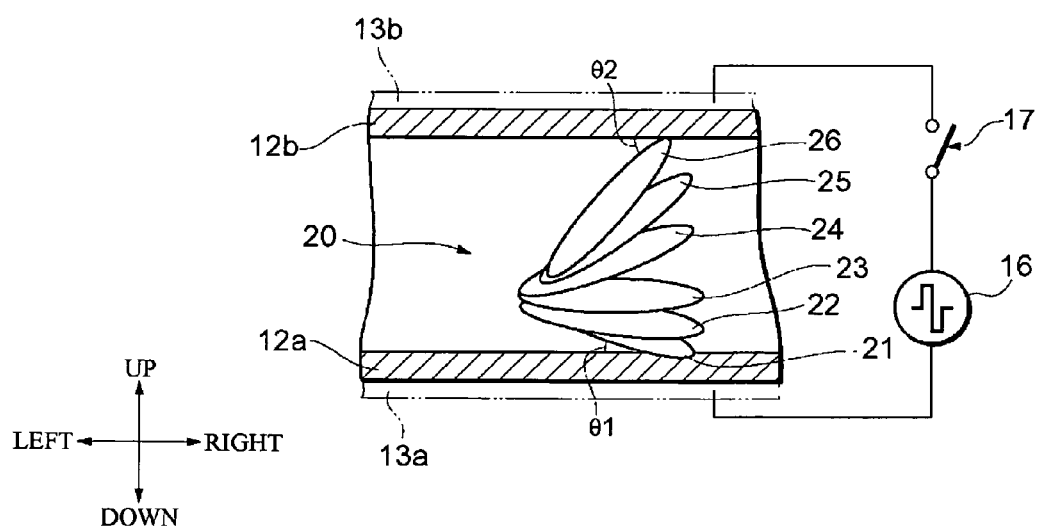
FIG. 5B is a pattern diagram showing tilt directions of the liquid crystal inside the reverse control liquid crystal cell.

With respect to the frontward, backward, leftward and rightward directions as shown in FIG. 3, the direction for aligning treatment of the alignment layer 12a is parallel to the direction such as shown by the arrow 21a. On the other hand, the direction for aligning treatment of the alignment layer 12b is parallel to the direction such as shown by the arrow 26a. Then, the directions for aligning treatment of the respective alignment layers 12a and 12b form a 90-degree angle in the frontward, backward, leftward and rightward directions. FIG. 5B shows a pattern with liquid crystal molecules 21 to 26 with respect to a portion of the alignment of the liquid crystal molecules inside the liquid crystal layer 20 in the upward and downward direction. Further, FIG. 4B shows the directors (major axis directions) of the liquid crystal molecules 21 to 26 in the frontward, backward, leftward and rightward directions, and the directors of the liquid crystal molecules 21 to 26 correspond respectively to the arrows 21a to 26a.

The liquid crystal molecules 21 and 26 being positioned closest to the alignment layers 12a and 12b are fixed along the aligning treatment directions, respectively. Thereby, their directors are parallel to the aligning treatment directions of the alignment layers 12a and 12b, respectively. Further, with respect to the lower liquid crystal molecule 22, its major axis direction is almost parallel to that of the arrow 21a; meanwhile, with respect to the upper liquid crystal molecule 25, its major axis direction is almost parallel to that of the arrow 26a. That is, viewing from above the whole picture of the liquid crystal molecules 21 to 26, they are aligned such that the directors are twisted as changing the directions little by little to turn 90 degrees clockwise in the frontward, backward, leftward and rightward directions.

The liquid crystal molecules 21 and 26 closest to the alignment layers 12a and 12b are, as shown in FIG. 5B, fixed in such a state as parallel to the rubbing directions and tilted at a pre-tilt angle to the substrate surfaces in the leftward, rightward, upward and downward directions. In the leftward, rightward, upward and downward directions, the liquid crystal molecule 21 is tilted to the alignment layer 12a at a pre-tilt angle θ1, and the liquid crystal molecule 26 is tilted to the alignment layer 12b at a pre-tilt angle θ2. The liquid crystal molecules 22 to 25 are disposed such that the tilt angles change gradually from approximately θ1 to approximately θ2 in the leftward, rightward, upward and downward directions in ascending order from the lower liquid crystal molecule 22 to the upper liquid crystal molecule 25 in the liquid crystal layer 20.

Next, descriptions will be made with respect to the assembly configuration of the display liquid crystal cell 30. Its basic configuration is the same as that of the reverse control liquid crystal cell 10, that is, it forms an area of the liquid crystal layer 40 by disposing two substrates 31 on the upper and lower sides, and enclosing the space sandwiched by the two substrates 31 with the seal material 34 on the front, back, left and right sides. Further, the transparent electrodes 33a and 35a are fixed on the upper surface of the lower substrate 31, and the transparent electrodes 33b and 35b are fixed on the lower surface of the upper substrate 31, wherein the transparent electrodes 33a and 33b, and the transparent electrodes 35a and 35b are disposed to form pairs vertically facing each other, respectively. Here, as described hereinbefore, the transparent electrodes 33a and 35b are electrically connected with the AC power supply 36. Then, the alignment layer 32a is fixed on the upper surface of the transparent electrodes 33a and 35a, and the alignment layer 32b is fixed on the lower surface of the transparent electrodes 33b and 35b. Further, the reverse control liquid crystal cell 10 and the display liquid crystal cell 30 are almost the same in the thickness of the vertical direction.

With respect to the frontward, backward, leftward and rightward directions as shown in FIG. 3, the direction for aligning treatment of the alignment layer 32a is parallel to the direction such as shown by the arrow 41a. On the other hand, the direction for aligning treatment of the alignment layer 32b is parallel to the direction such as shown by the arrow 46a. Then, the directions for aligning treatment of the respective alignment layers 32a and 32b form a 90-degree angle in the frontward, backward, leftward and rightward directions. FIG. 5A shows a pattern with liquid crystal molecules 41 to 46 with respect to a portion of the alignment of the liquid crystal molecules inside the liquid crystal layer 40 in the upward and downward direction. Further, FIG. 4A shows the directors (major axis directions) of the liquid crystal molecules 41 to 46 in the frontward, backward, leftward and rightward directions, and the directors of the liquid crystal molecules 41 to 46 correspond respectively to the arrows 41a to 46a.

The liquid crystal molecules 41 and 46 being positioned closest to the alignment layers 32a and 32b are fixed along the aligning treatment directions, respectively. Thereby, their directors are parallel to the aligning treatment directions of the alignment layers 32a and 32b, respectively. Further, with respect to the lower liquid crystal molecule 42, its major axis direction is almost parallel to that of the arrow 41a; meanwhile, with respect to the upper liquid crystal molecule 45, its major axis direction is almost parallel to that of the arrow 46a. That is, viewing from above the whole picture of the liquid crystal molecules 41 to 46, they are aligned such that the directors are twisted as changing the directions little by little to turn 90 degrees counterclockwise in the frontward, backward, leftward and rightward directions.

The liquid crystal molecules 41 and 46 closest to the alignment layers 32a and 32b are, as shown in FIG. 5A, fixed in such a state as parallel to the rubbing directions and tilted at a pre-tilt angle to the substrate surfaces in the leftward, rightward, upward and downward directions. In the leftward, rightward, upward and downward directions, the liquid crystal molecule 41 is tilted to the alignment layer 32a at a pre-tilt angle θ3, and the liquid crystal molecule 46 is tilted to the alignment layer 32b at a pre-tilt angle θ4. The liquid crystal molecules 42 to 45 are disposed such that the tilt angles change gradually from approximately θ3 to approximately θ4 in the leftward, rightward, upward and downward directions in ascending order from the lower liquid crystal molecule 42 to the upper liquid crystal molecule 45 in the liquid crystal layer 40.

Next, descriptions will be made with respect to the assembly configuration of the liquid crystal display 1 configured by utilizing the reverse control liquid crystal cell 10 and the display liquid crystal cell 30 of the above configurations.

In a state of the display liquid crystal cell 30 being fixed on the upper side of the reverse control liquid crystal cell 10, the two fixed liquid crystal cells are sandwiched by the lower polarizer 3 from below and the upper polarizer 4 from above. As shown in FIG. 3, the transmission axis direction 3a of the lower polarizer 3 is almost the same as the aligning treatment direction 21a of the alignment layer 12a (i.e. the director of the liquid crystal molecule 21), and the transmission axis direction 4a of the upper polarizer 4 is in a 90-degree turned position relation with the aligning treatment direction 46a of the alignment layer 32b (i.e. the director of the liquid crystal molecule 46). Further, the aligning treatment direction 26a of the alignment layer 12b (i.e. the director of the liquid crystal molecule 26) and the aligning treatment direction 41a of the alignment layer 32a (i.e. the director of the liquid crystal molecule 41) are configured to become parallel to each other in opposite directions (180-degree turned directions).

Further, the pre-tilt angles θ1 and θ4, as well as the pre-tilt angles θ2 and θ3, are almost the same angle, while the liquid crystal molecules 22 and 45, the liquid crystal molecules 23 and 44, the liquid crystal molecules 24 and 43, and the liquid crystal molecules 25 and 42 have almost the same tilt angle, respectively. Then, the backlight 2 is disposed below the lower polarizer 3, and the illumination light irradiated from the backlight 2 is configured to irradiate toward the reverse control liquid crystal cell 10 and the display liquid crystal cell 30 (i.e. from downside to upside).

So far, the descriptions have been made hereinabove with respect to the assembly configuration of the liquid crystal display 1. Now, in the following working examples 1 and 2, descriptions will be made with respect to a display method carried out by utilizing the above liquid crystal display 1.

Figure 7:
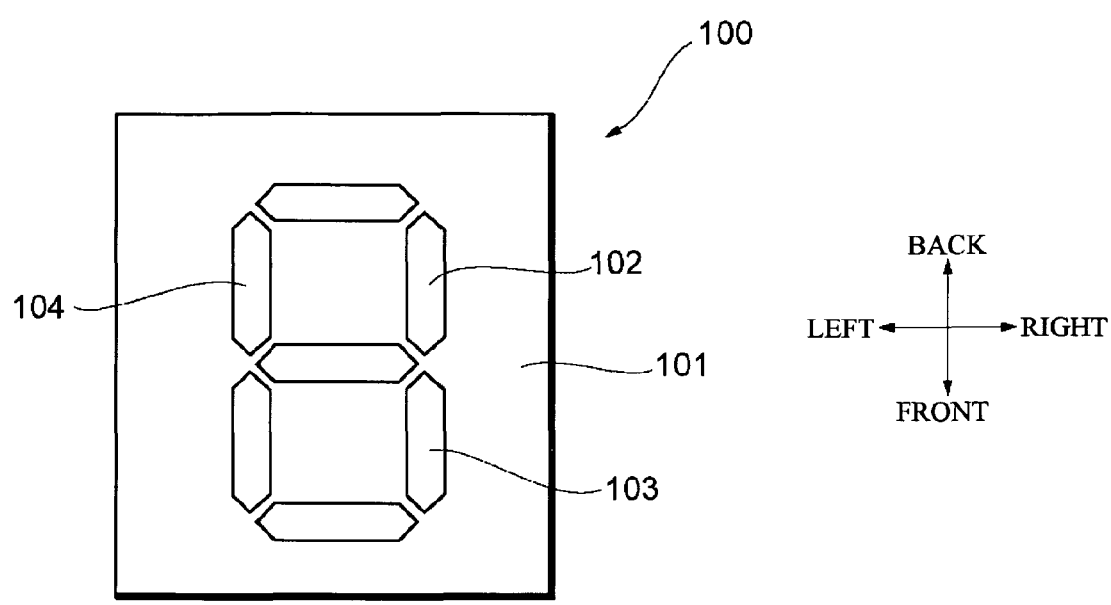
FIG. 7 is a plan view showing an example of transparent electrodes.

The liquid crystal display 1 renders a bright display in the portion where the illumination light from the backlight 2 is incoming from the lower polarizer 3 and outgoing through the upper polarizer 4. On the other hand, if there is a portion where the illumination light is not transmitted through the upper polarizer 4, then that portion is in a dark state as it is without any display (no display). Now, descriptions will be made with respect to an exemplary case of displaying the numeral 1 by utilizing a transparent electrode 100 configured to be capable of displaying the numerals 1 to 9. With respect to the display liquid crystal cell 30 of the aforementioned configuration, the display is configured by utilizing a pair of the transparent electrodes 100 having seven patterns 102, 103, 104, . . . , and a periphery portion 101 as shown in FIG. 7. This pair of transparent electrodes 100 is fixed to be a pair in a vertical direction, one between the lower substrate 31 and the alignment layer 32a and the other between the upper substrate 31 and the alignment layer 32b. Then, each pair of the corresponding patterns between the upper and lower ones (for example, the pair of the upper and lower patterns 102) is electrically connected to the AC power supply 36.

By virtue of the above configuration and applying a voltage only to the portions of the patterns 102 and 103, the illumination light is transmitted only through the patterns 102 and 103, and thereby the numeral 1 is brightly displayed. On the other hand, the illumination light is not transmitted through the other portions of the patterns 104, . . . , including the periphery portion 101, which are thus darkly displayed. That is, a desired display is carried out by the configuration of applying a voltage only to the pattern portions for the bright display so as to transmit the illumination light therethrough.

WORKING EXAMPLE 1

First, with respect to the negative mode shown in FIG. 1, explanations will be made in terms of an example as to how the illumination lights 2a and 2b travel. The illumination light 2a travels vertically through the portion of the transparent electrodes 33a and 33b inside the display liquid crystal cell 30, while the illumination light 2b travels vertically through the portion of the transparent electrodes 35a and 35b under voltage application. In the case of the negative mode shown in FIG. 1, the selection switch 17 is turned off, and the AC power supply 16 has not applied a voltage to the transparent electrodes 13a and 13b.

Although the illumination light 2a irradiated from the backlight 2 becomes a circularly-polarized light 2e on the plane vertical to the travelling direction (vertical direction) as shown in FIG. 3, because it is transmitted through the lower polarizer 3, only the linearly polarized light parallel to the transmission axis direction 3a enters the reverse control liquid crystal cell 10. The illumination light entering the reverse control liquid crystal cell 10 travels upward from below and changes the polarizing direction according to the twisted angles of the liquid crystal molecules 21 to 26 (the major axis directions of the liquid crystal molecules 21 to 26) due to the optical rotation of the liquid crystal molecules inside the liquid crystal layer 20, while changing the polarizing direction by 90 degrees clockwise in the frontward, backward, leftward and rightward directions, exiting the reverse control liquid crystal cell 10 and entering the display liquid crystal cell 30 with the direction of the arrow 26a as the polarizing direction.

Then, because of the optical rotation of the liquid crystal molecules inside the liquid crystal layer 40, the illumination light 2a entering the display liquid crystal cell 30 travels upward from below while changing the polarizing direction 90 degrees counterclockwise in the frontward, backward, leftward and rightward directions according to the twisted angles of the liquid crystal molecules 41 to 46 (the major axis directions of the liquid crystal molecules 41 to 46), and reaches the upper polarizer 4. The polarizing direction of the illumination light 2a reaching the upper polarizer 4 is shown by the arrow 46a, and since the arrow 46a is in a perpendicular position relation with the transmission axis direction 4a of the upper polarizer 4, as a result, the illumination light 2a cannot be transmitted through the upper polarizer 4. Thereby, viewing the liquid crystal display 1 from above the upper polarizer 4, the display is dark (no display).

On the other hand, after entering the reverse control liquid crystal cell 10 in the same manner as the aforementioned illumination light 2a, the illumination light 2b irradiated from the backlight 2 exits the reverse control liquid crystal cell 10 and enters the display liquid crystal cell 30.

Figure 6A:
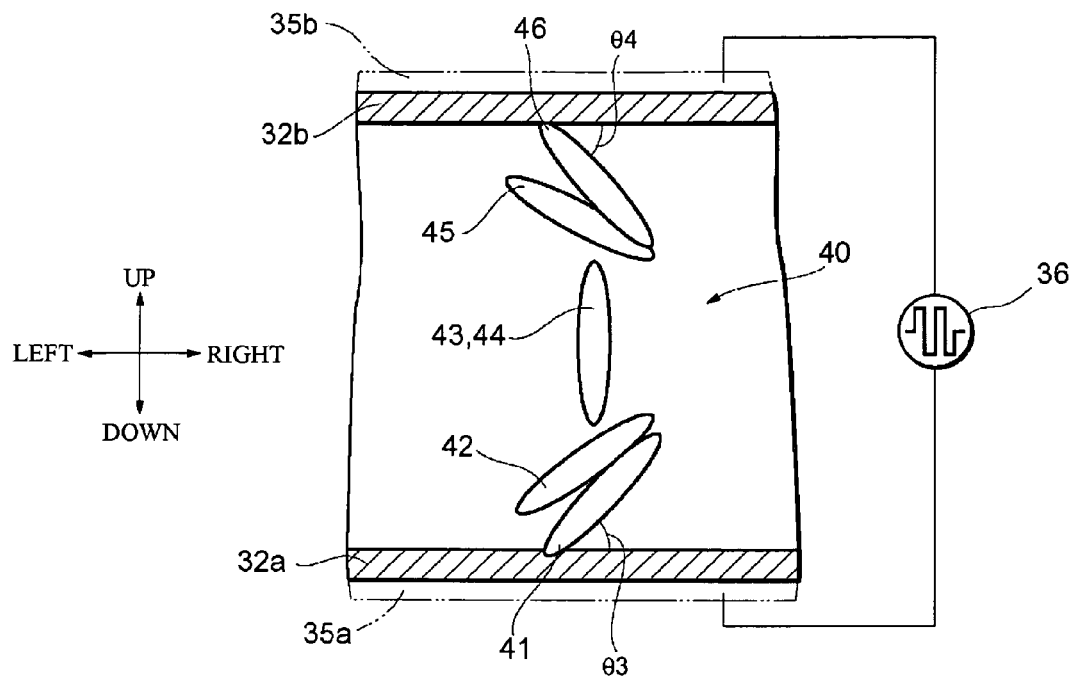
FIG. 6A is a pattern diagram showing tilt directions of the liquid crystal inside the display liquid crystal cell under voltage application.

Here, the AC power supply 36 applies a voltage to the transparent electrodes 35a and 35b, and FIG. 6A shows a state of the liquid crystal molecules 41 to 46 tilted at the time in the leftward, rightward, upward and downward directions. As shown in FIG. 6A, the liquid crystal molecules 41, 42, 45 and 46 in the vicinity of the alignment layers 32a and 32b are fixed in the aligning treatment direction of the alignment layers 32a and 32b, and thereby the tilt angles do not change before and after voltage application. On the other hand, the liquid crystal molecules 43 and 44 in the intermediate portion are aligned with the major axis directed vertically along the lines of electric force occurring between the transparent electrodes 35a and 35b.

The liquid crystal molecules inside the liquid crystal layer 40 are optically uniaxial birefringent crystal which has a birefringent property in the minor axis direction and not in the major axis direction. Thereby, the illumination light 2b travelling inside the liquid crystal layer 40 travels along the major axis direction of the liquid crystal molecules inside the liquid crystal layer 40 without being affected by the birefringent property of the liquid crystal molecules, and reaches the upper polarizer 4 without changing the polarizing direction. At the time, the polarizing direction of the illumination light 2b reaching the upper polarizer 4 is shown by the arrow 41a, which is parallel to the transmission axis direction 4a of the upper polarizer 4. As a result, the illumination light 2b is transmitted through the upper polarizer 4, and thereby viewing the liquid crystal display 1 from above the upper polarizer 4, the display looks bright.

When the illumination light 2b travels obliquely through the reverse control liquid crystal cell 10 and the display liquid crystal cell 30, retardation occurs in the illumination light 2b affected by the birefringent property of each liquid crystal molecule. However, in the light path through which the illumination light 2b travels, the liquid crystal molecules 21 and 46, the liquid crystal molecules 22 and 45, the liquid crystal molecules 25 and 42, and the liquid crystal molecules 26 and 41 are in such a position relation as compensates, i.e. cancels out, the retardation, respectively. As shown in FIGS. 4A and 4B, each pair of the liquid crystal molecules in the above compensational position relation is opposite to each other (i.e. 180-degree turned directions) in director and, as shown in FIGS. 5A and 5B, the tilt directions are reversed while the tilt angles are almost the same in the leftward, rightward, upward and downward directions.

By virtue of this, when the illumination light 2b travels through the liquid crystal molecule 46, for example, it is occurred with retardation completely opposite to that occurring in the liquid crystal molecule 21, and thereby the retardation occurring in the liquid crystal molecule 21 is cancelled out. In the same manner with respect to the other pairs of the liquid crystal molecules in the mutually compensational position relation, the illumination light 2b acts such that the retardation occurring inside the reverse control liquid crystal cell 10 is cancelled out by the retardation occurring inside the display liquid crystal cell 30. Thereby, when travelling obliquely, the illumination light 2b transmitted through the upper polarizer 4 does not have retardation, and thereby color shift does not occur in comparison with the illumination light 2b travelling straightforwardly in a vertical direction.

That is, with respect to the negative mode shown in FIG. 1, the portion of the transparent electrodes 33a and 33b is darkly displayed, while the portion of the transparent electrodes 35a and 35b is brightly displayed. Thereby, it is possible to brightly display a desired pattern on a darkly displayed background by utilizing a plurality of transparent electrodes 35a and 35b to form the desired pattern, and controlling the voltage application to the plurality of transparent electrodes 35a and 35b, respectively.

WORKING EXAMPLE 2

Next, with respect to the positive mode shown in FIG. 2, explanations will be made in terms of an example as to how the illumination lights 2c and 2d travel. The illumination light 2c travels vertically through the portion of the transparent electrodes 33a and 33b inside the display liquid crystal cell 30, while the illumination light 2d travels vertically through the portion of the transparent electrodes 35a and 35b under voltage application. In the case of the positive mode shown in FIG. 2, the selection switch 17 is turned on, and the AC power supply 16 has applied a voltage to the transparent electrodes 13a and 13b.

Figure 6B:
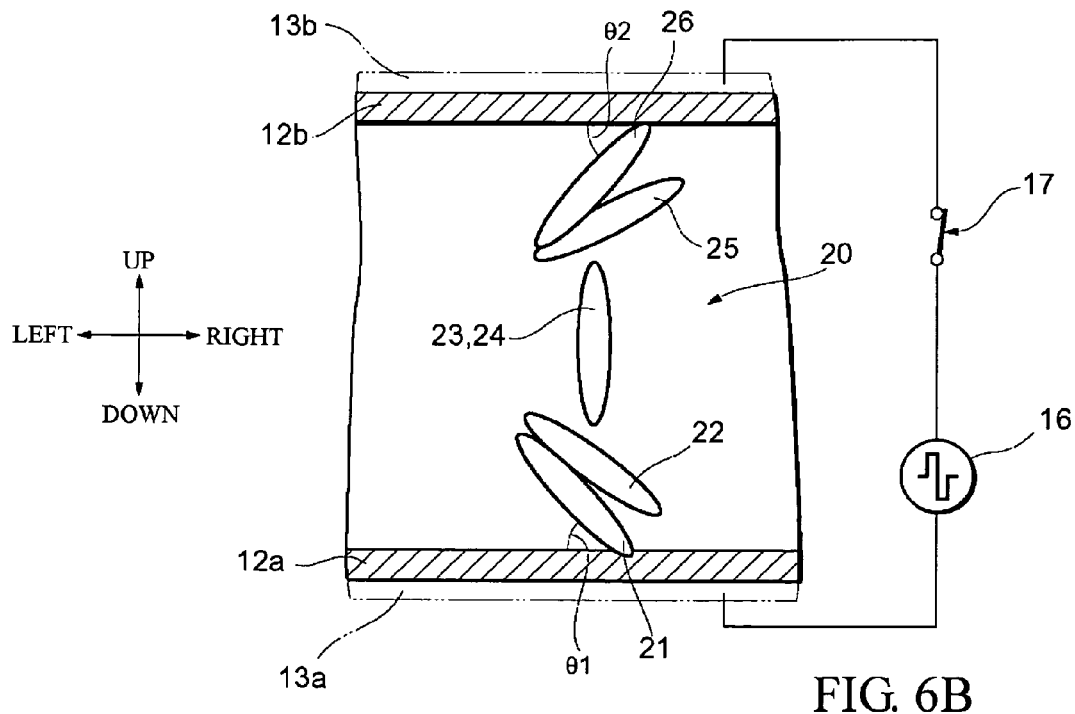
FIG. 6B is a pattern diagram showing tilt directions of the liquid crystal inside the reverse control liquid crystal cell under voltage application.

Although the illumination light 2c irradiated from the backlight 2 becomes a circularly-polarized light 2e on the plane vertical to the travelling direction (vertical direction) as shown in FIG. 3, because it is transmitted through the lower polarizer 3, only the linearly polarized light parallel to the transmission axis direction 3a enters the reverse control liquid crystal cell 10. At the time, since a voltage is applied to the transparent electrodes 13a and 13b, with respect to the liquid crystal molecules inside the liquid crystal layer 20 as shown in FIG. 6B, the liquid crystal molecules 21, 22, 25 and 26 in the vicinity of the alignment layers 12a and 12b are fixed to the alignment layers 12a and 12b by the aligning treatment of the alignment layers 12a and 12b, and thereby the tilt angles do not change before and after voltage application. On the other hand, the liquid crystal molecules 23 and 24 in the intermediate portion are aligned with the major axis directed vertically along the lines of electric force occurring between the transparent electrodes 13a and 13b.

Similar to the liquid crystal molecules inside the liquid crystal layer 40, the liquid crystal molecules inside the liquid crystal layer 20 are optically uniaxial birefringent crystal which has a birefringent property in the minor axis direction and not in the major axis direction. Thereby, the illumination light 2c travelling inside the liquid crystal layer 20 travels along the major axis direction of the liquid crystal molecules inside the liquid crystal layer 20 without being affected by the birefringent property of the liquid crystal molecules, and exits the reverse control liquid crystal cell 10 along the direction shown by the arrow 21a as it is without changing the polarizing direction.

The illumination light 2c exiting the reverse control liquid crystal cell 10 enters the display liquid crystal cell 30. Then, because of the optical rotation of the liquid crystal molecules inside the liquid crystal layer 40, the illumination light 2c entering the display liquid crystal cell 30 changes the polarizing direction 90 degrees counterclockwise in the frontward, backward, leftward and rightward directions, and reaches the upper polarizer 4. The polarizing direction of the illumination light 2c reaching the upper polarizer 4 is shown by the arrow 41a, and since the arrow 41a is parallel to the transmission axis direction 4a of the upper polarizer 4, as a result, the illumination light 2c can be transmitted through the upper polarizer 4. Thereby, viewing the liquid crystal display 1 from above the upper polarizer 4, the display is bright.

Further, when the illumination light 2c travels obliquely through the reverse control liquid crystal cell 10 and the display liquid crystal cell 30, retardation occurs in the illumination light 2c affected by the birefringent property of each liquid crystal molecule. However, in the light path through which the illumination light 2c travels, in the same manner as the aforementioned illumination light 2b, the liquid crystal molecules 21 and 46, the liquid crystal molecules 22 and 45, the liquid crystal molecules 25 and 42, and the liquid crystal molecules 26 and 41 are in such a position relation as compensates (i.e. cancels out) the retardation, respectively. Thereby, when travelling obliquely, the illumination light 2c transmitted through the upper polarizer 4 does not have retardation, and thereby color shift does not occur in comparison with the illumination light 2c travelling straightforwardly in a vertical direction.

On the other hand, after entering the reverse control liquid crystal cell 10 in the same manner as the aforementioned illumination light 2c, the illumination light 2d irradiated from the backlight 2 exits the reverse control liquid crystal cell 10 and enters the display liquid crystal cell 30, the polarizing direction being that shown by the arrow 21a as it is without change.

The illumination light 2d entering the display liquid crystal cell 30 travels inside the liquid crystal layer 40. At the time, the liquid crystal molecules inside the liquid crystal layer 40 are in a state shown in FIG. 6A; thereby, it travels along the major axis directions of the liquid crystal molecules in the same manner as the aforementioned illumination light 2b, and reaches the upper polarizer 4 without changing the polarizing direction. At the time, the polarizing direction of the illumination light 2d reaching the upper polarizer 4 is shown by the arrow 21*a*, and since the arrow 21*a* is in a perpendicular position relation with the transmission axis direction 4*a* of the upper polarizer 4, as a result, the illumination light 2*d* cannot be transmitted through the upper polarizer 4. Thereby, viewing the liquid crystal display 1 from above the upper polarizer 4, the display looks dark.

Figure 2:
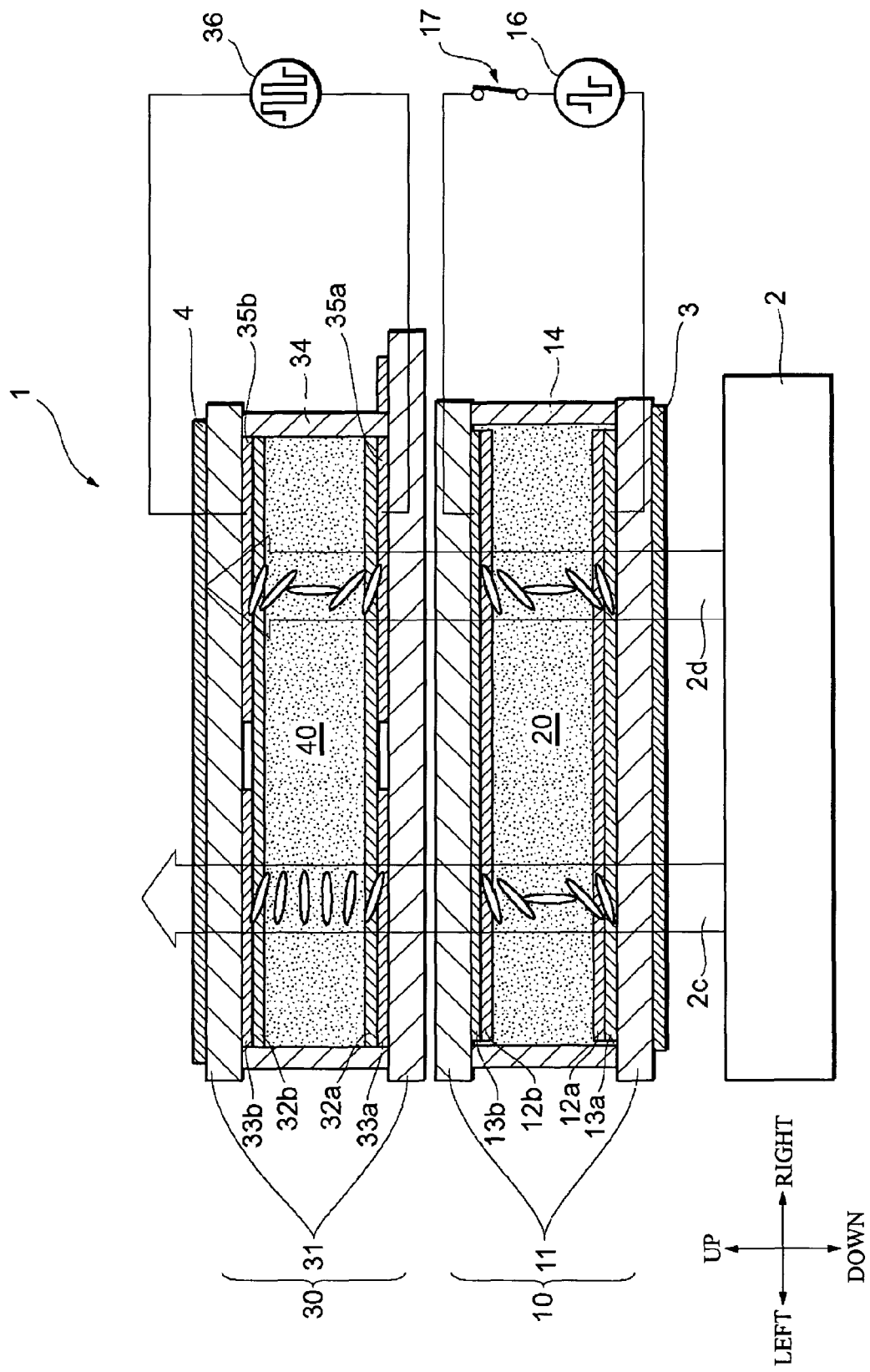
FIG. 2 is a sectional side view showing the liquid crystal display (positive mode) in accordance with the present invention.

That is, with respect to the positive mode shown in FIG. 2, the portion of the transparent electrodes 33*a* and 33*b* is brightly displayed, while the portion of the transparent electrodes 35*a* and 35*b* is darkly displayed. Thereby, it is possible to darkly display a desired pattern on a brightly displayed background by utilizing a plurality of transparent electrodes 35*a* and 35*b* to form the desired pattern, and controlling the voltage application to the plurality of transparent electrodes 35*a* and 35*b*, respectively.

Here, to make a brief summary with respect to the advantages of the liquid crystal display 1 in accordance with the present invention, first, the liquid crystal display 1 in accordance with the present invention is capable of switching between the negative mode and the positive mode, shown in the working example 1 and the working example 2 respectively, in an arbitrary and instant manner by operating the selection switch 17. Thereby, according to the brightness of the surrounding environments for utilizing the liquid crystal display 1, it is possible to display in a state of improved contrast between the background and the display pattern by appropriately carrying out an easy and instant switching between the negative mode and the positive mode, and thereby it is possible to constantly maintain a high visibility without being affected by the brightness of the surrounding environments. The liquid crystal display 1 can be installed in a car as an automotive liquid crystal display, for example, so that whether in daytime or at night when the surrounding brightness changes, it is still possible to constantly maintain a high visibility by switching between the negative mode and the positive mode to perform a display in a state of improved contrast between the background and the display pattern.

Second, the liquid crystals are aligned in such a manner as to cancel out the retardations for the illumination light obliquely travelling through a pair of liquid crystal molecules at positions corresponding to the upper liquid crystal layer 40 and the lower liquid crystal layer 20, respectively. By virtue of this configuration, the retardation occurring in the liquid crystal layer 20 is cancelled out by the retardation occurring in the liquid crystal layer 40. Thereby, the outgoing illumination light from the liquid crystal display 1 does not have retardation, and thus it is possible to display without color shift in comparison with the illumination light travelling straightforwardly. In other words, it is possible to widen the viewing angle of the liquid crystal display 1.

In the above working examples, the illumination light generated in the backlight 2 is configured to first enter the reverse control liquid crystal cell 10, successively exit the reverse control liquid crystal cell 10, and then enter the display liquid crystal cell 30. However, this sequence may be reversed such that the illumination light is configured to first enter the display liquid crystal cell 30, successively exit the display liquid crystal cell 30, and then enter the reverse control liquid crystal cell 10.

In the above working examples, the liquid crystal molecules of the liquid crystal layer 20 constitute the reverse control liquid crystal cell 10 and, in the frontward, backward, leftward and rightward directions, the directors turn 90 degrees clockwise. On the other hand, the liquid crystal molecules of the liquid crystal layer 40 constitute the display liquid crystal cell 30 and, in the frontward, backward, leftward and rightward directions, the directors turn 90 degrees counterclockwise. Here, these twist directions (i.e. turn directions) are not limited to the above directions, but may also be configured to turn the directors of the liquid crystal molecules of the liquid crystal layer 20 by 90 degrees counterclockwise, and turn the directors of the liquid crystal molecules of the liquid crystal layer 40 by 90 degrees clockwise. Further, each of the above turn angles is not limited to 90 degrees, but can be set arbitrarily within the range from 90 degrees to less than 180 degrees.

In the above working examples, the aligning treatment direction 26*a* of the alignment layer 12*b* (i.e. the director of the liquid crystal molecule 26) and the aligning treatment direction 41*a* of the alignment layer 32*a* (i.e. the director of the liquid crystal molecule 41) are configured to become parallel to each other and in opposite directions (i.e. 180-degree turned directions). However, they are not limited to this configuration, but may also be configured such that the aligning treatment direction 26*a* of the alignment layer 12*b* and the aligning treatment direction 41*a* of the alignment layer 32*a* intercross at a 90-degree angle.

In the above working examples, at the positions corresponding to the upper liquid crystal layer 40 and the lower liquid crystal layer 20, pairs of liquid crystal molecules are aligned to cancel out (i.e. compensate) retardations. However, they are not limited to this configuration, but even if pairs of liquid crystal molecules are not configured in the disposition of completely canceling out retardations, it is still possible to maintain a high visibility by switching between the negative mode and the positive mode.

In the above working examples, because the transparent electrodes 13*a* and 13*b* are configured to sandwich a portion of the liquid crystal layer 20 and to be under the control of voltage application, it is also possible to carry out switching between the negative mode and the positive mode for at least a portion of such as the periphery portion 101 and patterns 102, 103 and 104 positioned above the transparent electrodes 13*a* and 13*b*.

Figure 8:
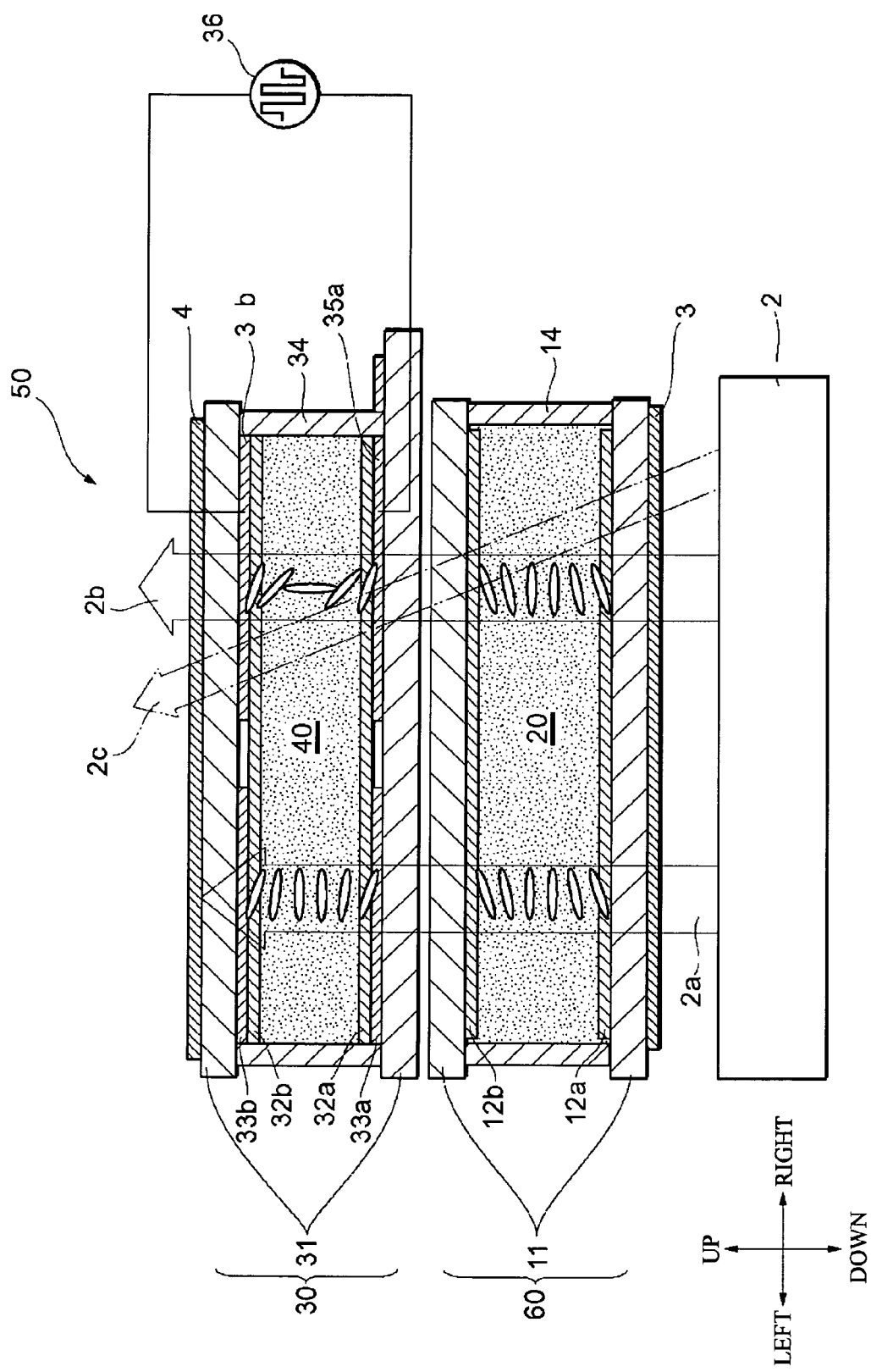
FIG. 8 is a sectional side view showing another liquid crystal display with color shift compensation in accordance with the present invention.

Next, referring to FIG. 8, descriptions will be made with respect to another liquid crystal display 50 in accordance with the present invention. The liquid crystal display 50 shown in FIG. 8 is different from the aforementioned liquid crystal display 1 shown in FIGS. 1 and 2 only in the aspect of its utilizing a compensation liquid crystal cell 60 instead of the reverse control liquid crystal cell 10. Further, because the components of the compensation liquid crystal cell 60 utilize the same components as the reverse control liquid crystal cell 10, the same components are designated by the same reference numerals, any explanation for which will be omitted as appropriate.

The compensation liquid crystal cell 60 is constituted into a flat plate by substrates 11, alignment layers 12*a* and 12*b*, a seal material 14, and a liquid crystal layer 20. The liquid crystal layer 20 is an optically uniaxial birefringent crystal which utilizes a twisted nematic liquid crystal material, and is formed by laminating liquid crystal molecules into layers having a regular director, and has a birefringent property in the minor axis direction and not in the major axis direction. To this twisted nematic liquid crystal material, a chiral material is added for controlling the twist pitch of the liquid crystal molecules. As a chiral material, for example, chiral nematic liquid crystals and cholesteric liquid crystals are utilized.

To describe the assembly configuration of the compensation liquid crystal cell 60, the compensation liquid crystal cell 60 forms an area of the liquid crystal layer 20 by disposing two substrates 11 on the upper and lower sides, and enclosing the space sandwiched by the two substrates 11 with the seal material 14 on the front, back, left and right sides. Further, the alignment layer 12a is fixed on the upper surface of the lower surface of the upper substrate 11, and the alignment layer 12b is fixed on the lower surface of the upper substrate 11.

Next, descriptions will be made with respect to the assembly configuration of the liquid crystal display 50 configured by utilizing the compensation liquid crystal cell 60 and the display liquid crystal cell 30 of the above configurations.

In a state of the display liquid crystal cell 30 being fixed on the upper side of the compensation liquid crystal cell 60, the two fixed liquid crystal cells are sandwiched by the lower polarizer 3 from below and the upper polarizer 4 from above. As shown in FIG. 3, the transmission axis direction 3a of the lower polarizer 3 is almost the same as the aligning treatment direction 21a of the alignment layer 12a (i.e. the director of the liquid crystal molecule 21) and the transmission axis direction 4a of the upper polarizer 4 is in a 90-degree turned position relation with the aligning treatment direction 46a of the alignment layer 32b (i.e. the director of the liquid crystal molecule 46). Further, the aligning treatment direction 26a of the alignment layer 12b (i.e. the director of the liquid crystal molecule 26) and the aligning treatment direction 41a of the alignment layer 32a (i.e. the director of the liquid crystal molecule 41) are configured to become parallel to each other in opposite directions (180-degree turned directions).

Further, the pre-tilt angles $\theta1$ and $\theta4$, as well as the pre-tilt angles $\theta2$ and $\theta3$, are almost the same angle, while the liquid crystal molecules 22 and 45, the liquid crystal molecules 23 and 44, the liquid crystal molecules 24 and 43, and the liquid crystal molecules 25 and 42 have almost the same tilt angle, respectively. Then, the backlight 2 is disposed below the lower polarizer 3, and the illumination light irradiated from the backlight 2 is configured to irradiate toward the compensation liquid crystal cell 60 and the display liquid crystal cell 30 (i.e. from downside to upside).

Next, descriptions will be made with respect to a display method carried out by utilizing the above liquid crystal display 50. The liquid crystal display 50 renders a bright display in the portion where the illumination light from the backlight 2 is incoming from the lower polarizer 3 and outgoing through the upper polarizer 4. On the other hand, if there is a portion where the illumination light is not transmitted through the upper polarizer 4, then that portion is in a dark state as it is without any display (no display). Now, descriptions will be made with respect to an exemplary case of displaying the numeral 1 by utilizing a transparent electrode 100 configured to be capable of displaying the numerals 1 to 9. With respect to the display liquid crystal cell 30 of the aforementioned configuration, the display is configured by utilizing a pair of the transparent electrodes 100 having seven patterns 102, 103, 104, . . . , and a periphery portion 101 as shown in FIG. 7. This pair of transparent electrodes 100 is fixed to be a pair in a vertical direction, one between the lower substrate 31 and the alignment layer 32a and the other between the upper substrate 31 and the alignment layer 32b. Then, each pair of the corresponding patterns between the upper and lower ones (for example, the pair of the upper and lower patterns 102) is electrically connected to the AC power supply 36.

By virtue of the above configuration and applying a voltage only to the portions of the patterns 102 and 103, the illumination light is transmitted only through the patterns 102 and 103, and thereby the numeral 1 is brightly displayed. On the other hand, the illumination light is not transmitted through the other portions of the patterns 104, . . . , including the periphery portion 101, which are thus darkly displayed. That is, a desired display is carried out by the configuration of applying a voltage only to the pattern portions for the bright display so as to transmit the illumination light therethrough. Thereby, descriptions will be made hereinbelow with respect to three divided states: the state of the illumination light being transmitted through the upper polarizer 4; the state of the illumination light being not transmitted through the upper polarizer 4; and the state of viewing the illumination light being transmitted through the upper polarizer 4 from an oblique direction.

First, descriptions will be made with respect to the state of the illumination light being transmitted through the upper polarizer 4. Here, it is when the AC power supply 36 applies a voltage to the transparent electrodes 35a and 35b that the illumination light 2b is transmitted through the upper polarizer 4 (in the above example, the portion of the patterns 102 and 103). FIG. 6A shows a state of the liquid crystal molecules 41 to 46 tilted in the leftward, rightward, upward and downward direction when a voltage is applied to the transparent electrodes 35a and 35b. As shown in FIG. 6A, the liquid crystal molecules 41, 42, 45 and 46 in the vicinity of the alignment layers 32a and 32b are fixed to the alignment layers 32a and 32b by the aligning treatment of the alignment layers 32a and 32b, and thereby the tilt angles do not change before and after voltage application. On the other hand, the liquid crystal molecules 43 and 44 in the intermediate portion are aligned with the major axis directed vertically along the lines of electric force occurring between the transparent electrodes 35a and 35b.

Figure 9:
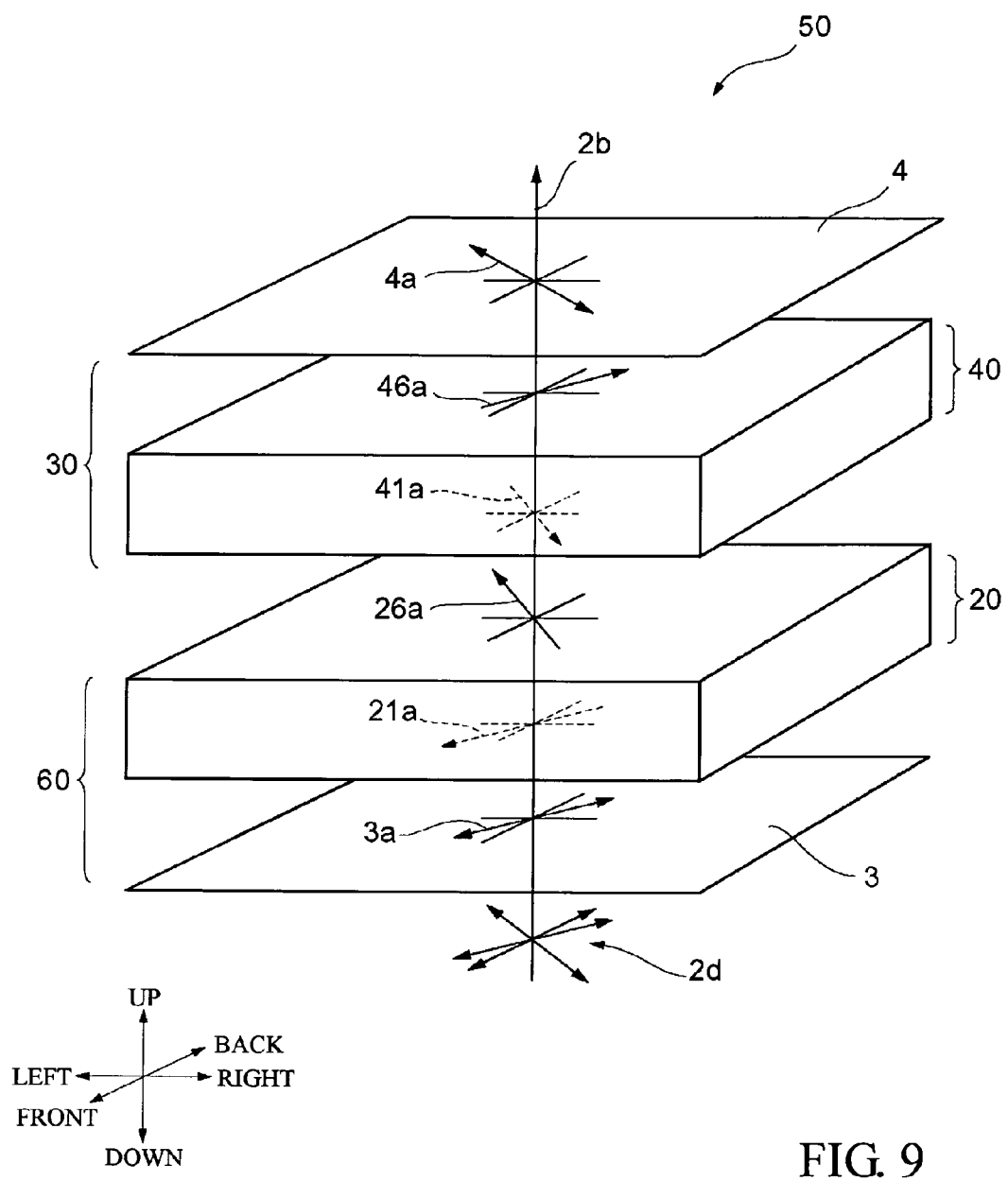
FIG. 9 is a pattern diagram showing directors of the other liquid crystal display in accordance with the present invention.
Figure 10:
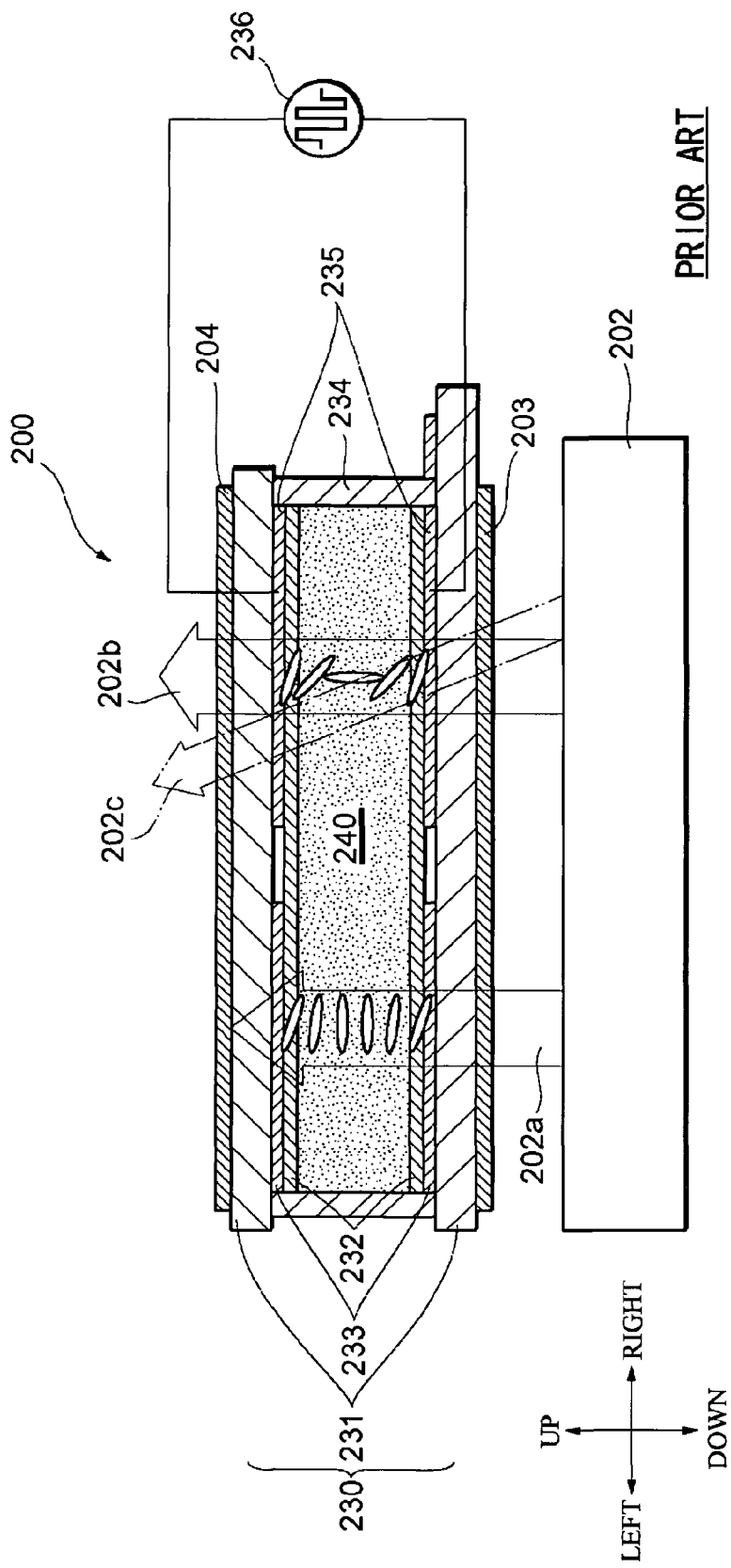
FIG. 10 is a sectional side view showing a conventional liquid crystal display.
Figure 11:
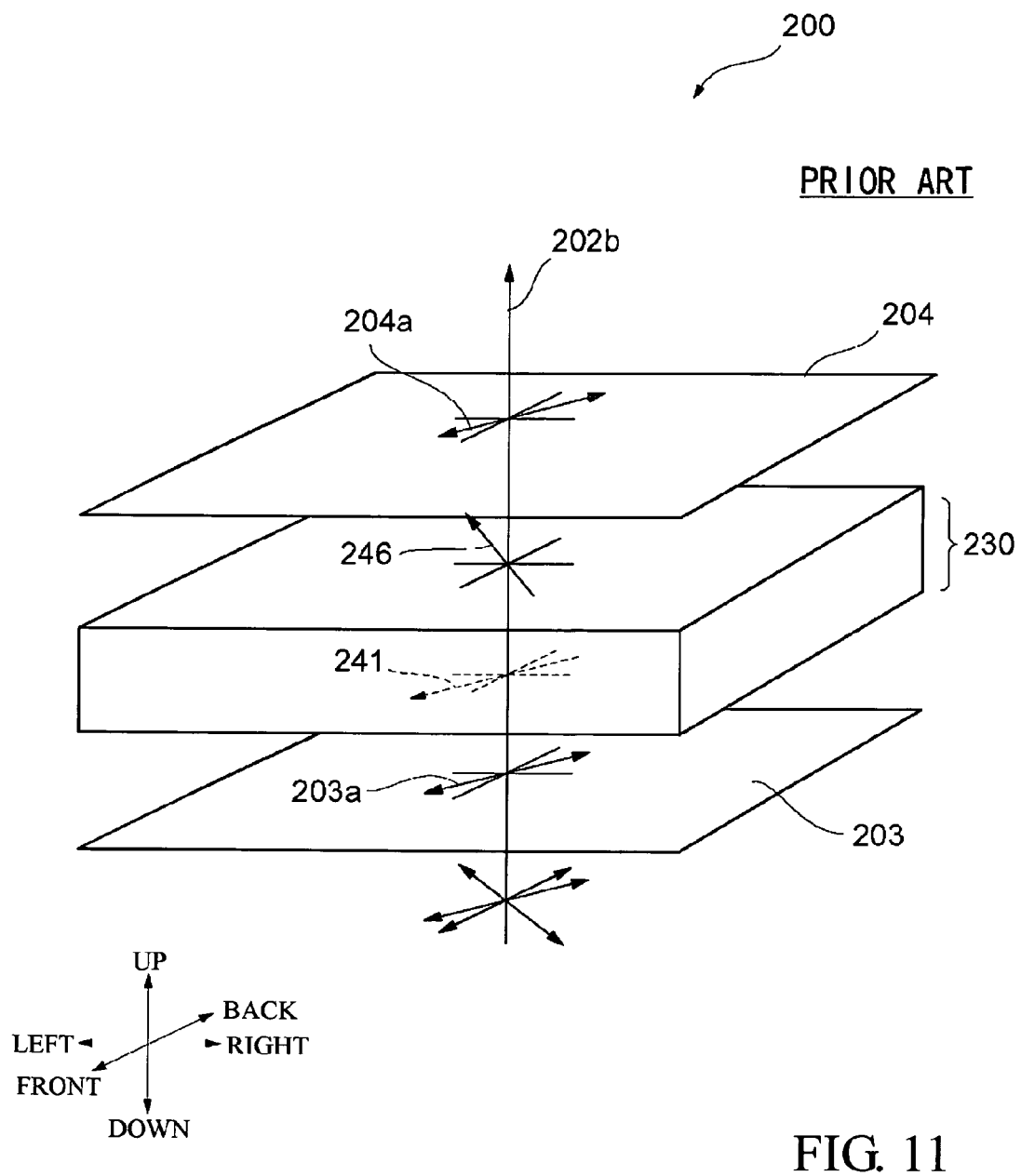
FIG. 11 is a pattern diagram showing directors of the conventional liquid crystal display.

At the time, although the illumination light 2b irradiated from the backlight 2 becomes a circularly-polarized light 2d on the plane vertical to the travelling direction (vertical direction) as shown in FIG. 9, because it is transmitted through the lower polarizer 3, only the linearly polarized light parallel to the transmission axis direction 3a enters the compensation liquid crystal cell 60. The illumination light entering the compensation liquid crystal cell 60 travels upward from below and changes the polarizing direction according to the twisted angles of the liquid crystal molecules 21 to 26 (the major axis directions of the liquid crystal molecules 21 to 26) due to the optical rotation of the liquid crystal molecules inside the liquid crystal layer 20, while changing the polarizing direction by 90 degrees clockwise in the frontward, backward, leftward and rightward directions, exiting the compensation liquid crystal cell 60 and entering the display liquid crystal cell 30 with the direction of the arrow 26a as the polarizing direction.

At the time, the liquid crystal molecules inside the liquid crystal layer 40 are, as shown in the aforementioned FIG. 6A, such that the major axis is in a vertical directed state and, here, the liquid crystal molecules inside the liquid crystal layer 40 are optically uniaxial birefringent crystal which has a birefringent property in the minor axis direction and not in the major axis direction. Thereby, the illumination light 2b travelling inside the liquid crystal layer 40 travels along the major axis direction of the liquid crystal molecules inside the liquid crystal layer 40 without being affected by the birefringent property of the liquid crystal molecules, and reaches the upper polarizer 4 without changing the polarizing direction. At the time, the polarizing direction of the illumination light 2b reaching the upper polarizer 4 is shown by the arrow 41a, which is parallel to the transmission axis direction 4a of the upper polarizer 4. As a result, the illumination light 2b is transmitted through the upper polarizer 4, and thereby viewing the liquid crystal display 50 from above the upper polarizer 4, the display looks bright.

Next, descriptions will be made with respect to the state of the illumination light being not transmitted through the upper polarizer 4. Here, it is when the illumination light does not travel through the transparent electrodes 35a and 35b to which the AC power supply 36 does not apply a voltage (in the above example, the portion of the pattern 104), and when the illumination light travels through the transparent electrodes 33a and 33b (in the above example, the periphery portion 104), that the illumination light is not transmitted through the upper polarizer 4. Hereinbelow, to describe the case of the illumination light 2a being transmitted through the transparent electrodes 33a and 33b, the illumination light 2a shown in FIG. 8 acts in the same manner as the aforementioned illumination light 2b when travelling inside the compensation liquid crystal cell 60.

Then, because of the optical rotation of the liquid crystal molecules inside the liquid crystal layer 40, the illumination light 2a exiting the compensation liquid crystal cell 60 and entering the display liquid crystal cell 30 travels upward from below while changing the polarizing direction 90 degrees counterclockwise in the frontward, backward, leftward and rightward directions according to the twisted angles of the liquid crystal molecules 41 to 46 (the major axis directions of the liquid crystal molecules 41 to 46), and reaches the upper polarizer 4. The polarizing direction of the illumination light 2a reaching the upper polarizer 4 is shown by the arrow 46a, and since the arrow 46a is in a perpendicular position relation with the transmission axis direction 4a of the upper polarizer 4, as a result, the illumination light 2a cannot be transmitted through the upper polarizer 4. Thereby, viewing the liquid crystal display 50 from above the upper polarizer 4, the display is dark (no display). Further, when the illumination light travels through the transparent electrodes 35a and 35b to which the AC power supply 36 does not apply a voltage, in the same manner, the illumination light cannot be transmitted through the upper polarizer 4, and thereby the display is dark (no display).

Next, descriptions will be made with respect to the state of viewing an illumination light being transmitted through the upper polarizer 4 from an oblique direction. This is the case of viewing an oblique illumination light 2c being transmitted through the upper polarizer 4, shown by the arrow of long dashed double-dotted line in FIG. 8 by obliquely viewing the liquid crystal display 50 from above. This oblique illumination light 2c is an illumination light being obliquely transmitted through the display liquid crystal cell 30 in a state that the AC power supply 36 applies a voltage to the transparent electrodes 35a and 35b. Here, when the oblique illumination light 2c irradiated from the backlight 2 as shown in FIG. 8 travels obliquely upward through the compensation liquid crystal cell 60, retardation occurs in the light transmitted in the minor axis direction of the liquid crystal molecules inside the liquid crystal layer 20 or in an oblique direction due to the birefringent influence. That is, as shown in FIG. 5B, each liquid crystal molecules 21 to 26 has an intrinsic tilt angle in the leftward, rightward, upward and downward directions, and the oblique illumination light 2c exits the compensation liquid crystal cell 60 with the polarizing direction as the direction of the arrow 26a, in a state that retardation has occurred due to the birefringent influence exerted by transmission through the compensation liquid crystal cell 60.

Then, exiting the compensation liquid crystal cell 60, the oblique illumination light 2c travels inside the display liquid crystal cell 30 with the direction of the arrow 41a as the polarizing direction. At the time, the liquid crystal molecules inside the liquid crystal layer 40 are in a state shown in the aforementioned FIG. 6A due to voltage application. Then, the liquid crystal molecules 21 and 46, the liquid crystal molecules 22 and 45, the liquid crystal molecules 25 and 42, and the liquid crystal molecules 26 and 41 are in such a position relation as compensates, i.e. cancels out, the retardation, respectively. As shown in FIGS. 4A and 4B, each pair of the liquid crystal molecules in the above mutually compensational position relation is opposite to each other (i.e. 180-degree turned directions) in director and, as shown in FIGS. 5A and 5B, the tilt directions are reversed while the tilt angles are almost the same in the leftward, rightward, upward and downward directions. Thereby, when the oblique illumination light 2c travels through the liquid crystal molecule 46, for example, it is bestowed with retardation completely opposite to that occurring in the liquid crystal molecule 21, and thereby the retardation occurring in the liquid crystal molecule 21 is cancelled out. In the same manner with respect to the other pairs of the liquid crystal molecules in the compensational position relation, the oblique illumination light 2c acts such that the retardation occurring inside the compensation liquid crystal cell 60 is cancelled out by the retardation occurring inside the display liquid crystal cell 30.

Then, the oblique illumination light 2c travels inside the display liquid crystal cell 30 along the major axis direction of the liquid crystal molecules without being affected by the birefringent property of the liquid crystal molecules. At the time, since the retardation occurring in the liquid crystal molecules in the vicinity of the alignment layers 32a and 32b is cancelled out by the retardation occurring in the compensation liquid crystal cell 60, the oblique illumination light 2c reaches the upper polarizer 4 without changing the polarizing direction. Therefore, the oblique illumination light 2c reaching the upper polarizer 4 does not have retardation, and the polarizing direction is shown by the arrow 41a, which is parallel to the transmission axis direction 4a of the upper polarizer 4. As a result, the oblique illumination light 2c is transmitted through the upper polarizer 4. Thereby, even if the liquid crystal display 50 is viewed obliquely from above, the display is still bright. Further, because the oblique illumination light 2c transmitted through the upper polarizer 4 does not have retardation as described above, the color does not shift in comparison with the case of viewing the illumination light 2b. Hence, regardless of the direction of viewing the liquid crystal display 50, it is possible to view a display without the occurrence of color shift.

Here, to make a brief summary with respect to the advantages of the liquid crystal display 50 in accordance with the present invention, first, liquid crystals are aligned in such a manner as to cancel out the mutual retardations for the oblique illumination light 2c obliquely travelling, as described hereinbefore, through a pair of liquid crystal molecules at positions corresponding to the upper liquid crystal layer 40 and the lower liquid crystal layer 20, respectively. Here, because they are aligned to pay special attention to the director and tilt angle (pre-tilt angle) of the liquid crystal molecules, in the liquid crystal layer 40, the oblique illumination light 2c is bestowed with retardation completely opposite to that occurring inside the liquid crystal layer 20, and thereby configured to cancel out the retardation occurring inside the liquid crystal layer 20. Thereby, the outgoing illumination light 2c from the liquid crystal display 50 does not have retardation, and thus it is possible to display without color shift in comparison with the illumination light 2b travelling straightforwardly. In other words, it is possible to widen the viewing angle of the liquid crystal display 50.

Second, even if effect of temperature change occurs in both liquid crystal layers—the liquid crystal layer 40 and the liquid crystal layer 20 (both liquid crystal molecules), the twist pitches of the liquid crystal molecules can still be maintained at almost the same by adding a chiral material for maintaining the twist pitches of the both liquid crystal molecules at almost the same. Thereby, even if effect of temperature change occurs in the both liquid crystal layers, it is still possible to maintain such an alignment of the liquid crystal molecules as to cancel out the aforementioned mutual retardations for the oblique illumination light 2c travelling obliquely. For example, when the liquid crystal display 50 is disposed in a small space easy to give rise to effect of temperature change, it is possible for the liquid crystal display 50 to deter color shift and maintain a wide viewing angle.

In the above working example, the illumination light generated in the backlight 2 is configured to first enter the compensation liquid crystal cell 60, successively exit the compensation liquid crystal cell 60, and then enter the display liquid crystal cell 30. However, this sequence may be reversed such that the illumination light is configured to first enter the display liquid crystal cell 30, successively exit the display liquid crystal cell 30, and then enter the compensation liquid crystal cell 60.

In the above working example, the liquid crystal molecules of the liquid crystal layer 20 constitute the compensation liquid crystal cell 60 and, in the frontward, backward, leftward and rightward directions, the directors turn 90 degrees clockwise. On the other hand, the liquid crystal molecules of the liquid crystal layer 40 constitute the display liquid crystal cell 30 and, in the frontward, backward, leftward and rightward directions, the directors turn 90 degrees counterclockwise. Here, these twist directions (turn directions) are not limited to the above directions, but may also be configured to turn the directors of the liquid crystal molecules of the liquid crystal layer 20 by 90 degrees counterclockwise, and turn the directors of the liquid crystal molecules of the liquid crystal layer 40 by 90 degrees clockwise.

In the above working example, the transparent electrodes are incorporated into the display liquid crystal cell 30 alone. However, they are not limited to this configuration, but may also be incorporated into both the display liquid crystal cell 30 and the compensation liquid crystal cell 60, for example, and thereby it becomes possible to display information twice as much as that of the above working example.

In the above working example, the display is of a bright and dark type (in black and white). However, it is possible to carry out color display by inserting and disposing a color filter between the alignment layers 32a and 32b of the display liquid crystal cell 30 and each transparent electrode, respectively.

In the above working example, the alignment layers 32a, 32b, 12a and 12b are incorporated into the display liquid crystal cell 30 and the compensation liquid crystal cell 60, and the liquid crystal molecules are configured to have pre-tilt angles (2 to 10 degrees). However, they are not limited to this configuration, and the liquid crystal molecules can be configured, for example, not to have pre-tilt angles (pre-tilt angle is zero degree).

At present, display methods are generally in the form of segment display, dot matrix display, and the like. Here, because the liquid crystal display 50 in accordance with the present invention is configured by utilizing segment display, it is possible to conspicuously acquire the effect of the present invention to realize a wide viewing angle with little color shift.

In the above working example, a retardation film may be bonded onto one surface of the upper polarizer 4 and one surface of the lower polarizer 3, or one surface of either the upper polarizer 4 or the lower polarizer 3.

The invention claimed is:
1. A liquid crystal display comprising:
an upside liquid crystal cell composed of upside substrates disposed parallel to each other, a pair of plate-shaped transparent upside electrodes disposed parallel to the upside substrates between the upside substrates, and an upside liquid crystal layer sealed in a layered form between the pair of upside electrodes;
a downside liquid crystal cell composed of downside substrates disposed parallel to each other, a pair of plate-shaped transparent downside electrodes disposed parallel to the downside substrates between the downside substrates, and a downside liquid crystal layer sealed in a layered form between the pair of downside electrodes, and disposed on the lower surface of the upside liquid crystal cell to join therewith;
an upside polarizer allowing linearly polarized light of a predetermined transmission axis direction to be transmitted therethrough, and disposed on the upper surface of the upside liquid crystal cell to join therewith; and
a downside polarizer allowing linearly polarized light of a predetermined transmission axis direction to be transmitted therethrough, and disposed on the lower surface of the downside liquid crystal cell to loin therewith;
wherein upside liquid crystal molecules constituting the upside liquid crystal layer are positioned to twist in a first twist direction along a helical axis parallel to the normal of the upside substrates, while downside liquid crystal molecules constituting the downside liquid crystal layer are positioned to twist in a second twist direction along a helical axis parallel to the normal of the downside substrates, and the first twist direction is opposite to the second twist direction;
wherein the pre-tilt angle of the upside liquid crystal molecules positioned in the upper-end vicinity of the upside liquid crystal layer is in opposite direction to and has almost the same degree as that of the downside liquid crystal molecules positioned in the lower-end vicinity of the downside liquid crystal layer; and the pre-tilt angle of the upside liquid crystal molecules positioned in the lower-end vicinity of the upside liquid crystal layer is in opposite direction to and has almost the same degree as that of the downside liquid crystal molecules positioned in the upper-end vicinity of the downside liquid crystal layer;
wherein the director of the upside liquid crystal molecules positioned in the lower-end vicinity of the upside liquid crystal layer is 180-degree opposite to that of the downside liquid crystal molecules positioned in the upper-end vicinity of the downside liquid crystal layer;
wherein one electrode pair of the pair of upside electrodes and the pair of downside electrodes has a plurality of pattern electrodes forming a desired pattern among the total electrodes forming an entire display area;
wherein the other electrode pair of the pair of upside electrodes and the pair of downside electrodes sandwiches at least a portion of the upside liquid crystal molecules or at least a portion of the downside liquid crystal molecules;
wherein with respect to the entire display area displayed by bright display or dark display, each of the plurality of pattern electrodes is under voltage application control so as to display the desired pattern by bright and dark display opposite to the entire display area; and
wherein a voltage is applied to the other electrode pair so as to change the director of at least a portion of the upside liquid crystal molecules or the director of at least a portion of the downside liquid crystal molecules to a direction parallel to the normal of the upside substrates or to a direction parallel to the normal of the downside substrates, thereby reversing the bright and dark displays of at least a portion of the entire display area and at least a portion of the desired pattern; and wherein the twisted angle of the upside liquid crystal molecules relative to the first twist direction and the twisted angle of the downside liquid crystal molecules relative to the second twist direction are equal to or above 90 degrees and below 180 degrees.

2. The liquid crystal display according to claim 1, wherein the pair of upside electrodes and the pair of downside electrodes are configured by utilizing transparent electrodes such as those of ITO and the like.

3. A liquid crystal display comprising:

an upside liquid crystal cell composed of a pair of transparent upside substrates disposed parallel to each other, and an upside liquid crystal layer sealed in a layered form between the pair of upside substrates;

a downside liquid crystal cell composed of a pair of transparent downside substrates disposed parallel to each other, a pair of plate-shaped transparent upside electrodes disposed parallel to the upside substrates between the upside substrates, and a downside liquid crystal layer sealed in a layered form between the pair of downside substrates, and disposed on the lower surface of the upside liquid crystal cell to join therewith;

an upside polarizer allowing linearly polarized light of a predetermined transmission axis direction to be transmitted therethrough, and disposed on the upper surface of the upside liquid crystal cell to join therewith; and a downside polarizer allowing linearly polarized light of a predetermined transmission axis direction to be transmitted therethrough, and disposed on the lower surface of the downside liquid crystal cell to join therewith, wherein upside liquid crystal molecules constituting the upside liquid crystal layer are positioned to twist in a first twist direction along a helical axis parallel to the normal of the upside substrates, while downside liquid crystal molecules constituting the downside liquid crystal layer are positioned to twist in a second twist direction along a helical axis parallel to the normal of the downside substrates, and the first twist direction is opposite to the second twist direction;

wherein the pre-tilt angle of the upside liquid crystal molecules positioned in the upper-end vicinity of the upside liquid crystal layer is in opposite direction to and has almost the same degree as that of the downside liquid crystal molecules positioned in the lower-end vicinity of the downside liquid crystal layer, while the pre-tilt angle of the upside liquid crystal molecules positioned in the lower-end vicinity of the upside liquid crystal layer is in opposite direction to and has almost the same degree as that of the downside liquid crystal molecules positioned in the upper-end vicinity of the downside liquid crystal layer;

wherein the director of the upside liquid crystal molecules positioned in the lower-end vicinity of the upside liquid crystal layer is 180-degree opposite to that of the downside liquid crystal molecules positioned in the upper-end vicinity of the downside liquid crystal layer; and wherein the twisted angle of the upside liquid crystal molecules relative to the first twist direction and the twisted angle of the downside liquid crystal molecules relative to the second twist direction are equal to or above 90 degrees and below 180 degrees.

4. The liquid crystal display according to claim 3, wherein the upside liquid crystal molecules and the downside liquid crystal molecules are derived from twisted nematic liquid crystal having an identical birefringent property.

5. The liquid crystal display according to claim 3, wherein at least one is almost parallel to the other between the predetermined transmission axis direction of the upside polarizer and the director of the upside liquid crystal molecules positioned in the upper-end vicinity of the upside liquid crystal layer, and between the predetermined transmission axis direction of the downside polarizer and the director of the downside liquid crystal molecules positioned in the lower-end vicinity of the downside liquid crystal layer.

* * * * *